United States Patent
Kim et al.

(10) Patent No.: US 10,585,580 B2
(45) Date of Patent: Mar. 10, 2020

(54) MOBILE TERMINAL WITH APPLICATION REEXECUTION

(71) Applicant: LG ELECTRONICS INC., Seoul (KR)

(72) Inventors: Seongeun Kim, Seoul (KR); Jie Seol, Seoul (KR); Yujune Jang, Seoul (KR); Bongjeong Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 116 days.

(21) Appl. No.: 15/600,459

(22) Filed: May 19, 2017

(65) Prior Publication Data

US 2018/0188951 A1 Jul. 5, 2018

(30) Foreign Application Priority Data

Jan. 4, 2017 (KR) ........................ 10-2017-0001258

(51) Int. Cl.
*G06F 3/048* (2013.01)
*G06F 3/0488* (2013.01)
*H04W 88/02* (2009.01)
*H04W 4/60* (2018.01)

(52) U.S. Cl.
CPC ............ *G06F 3/0488* (2013.01); *H04W 4/60* (2018.02); *H04W 88/02* (2013.01); *G06F 2203/014* (2013.01); *G06F 2203/04808* (2013.01)

(58) Field of Classification Search
CPC ....... H04W 4/60; H04W 88/02; G06F 3/0488; G06F 2203/014; G06F 2203/04808
See application file for complete search history.

(56) References Cited

U.S. PATENT DOCUMENTS

| | | | |
|---|---|---|---|
| 8,209,628 B1* | 6/2012 | Davidson | G06F 3/0487 715/790 |
| 2005/0268301 A1 | 12/2005 | Kelley et al. | |
| 2009/0256807 A1* | 10/2009 | Nurmi | G06F 3/0338 345/173 |

(Continued)

FOREIGN PATENT DOCUMENTS

| | | | |
|---|---|---|---|
| CN | 105912208 A | * | 8/2016 |
| JP | 2015-99978 A | | 5/2015 |

(Continued)

*Primary Examiner* — Kieu D Vu
*Assistant Examiner* — Asteway T Gattew
(74) *Attorney, Agent, or Firm* — Birch, Stewart, Kolasch & Birch, LLP

(57) ABSTRACT

A mobile terminal including a wireless communication processor configured to provide wireless communication; a touch screen; and a controller configured to in response to a request to execute an application, execute the application and display an execution screen of the application on the touch screen, terminate the application and stop displaying the execution screen on the touch screen, and in response to a request to re-execute the terminated application, re-execute the application and display an initial screen on the touch screen among any one of a first screen set in an initial stage of the application being executed, a second screen displayed on the touch screen before the application is terminated, and a third screen designated through a first predetermined input for at least one page provided through the application.

15 Claims, 30 Drawing Sheets

(56) References Cited

U.S. PATENT DOCUMENTS

| | | | | |
|---|---|---|---|---|
| 2010/0171983 A1* | 7/2010 | Asakawa | ............ | H04N 1/00408 |
| | | | | 358/1.15 |
| 2012/0060089 A1* | 3/2012 | Heo | ...................... | G06F 1/1647 |
| | | | | 715/702 |
| 2012/0293551 A1* | 11/2012 | Momeyer | ............. | G06F 3/0488 |
| | | | | 345/633 |
| 2013/0135200 A1* | 5/2013 | Iwashita | ................ | G06F 1/1626 |
| | | | | 345/156 |
| 2014/0073299 A1* | 3/2014 | Ham | ..................... | H04W 4/023 |
| | | | | 455/414.3 |
| 2014/0247240 A1 | 9/2014 | Sinclair et al. | | |
| 2015/0253918 A1* | 9/2015 | Algreatly | .............. | G06F 3/0414 |
| | | | | 345/174 |
| 2017/0060315 A1* | 3/2017 | Park | ...................... | G06F 3/0482 |
| 2017/0068381 A1* | 3/2017 | Choi | ...................... | G06F 3/0414 |

FOREIGN PATENT DOCUMENTS

| | | | |
|---|---|---|---|
| KR | 10-2011-0056831 A | | 5/2011 |
| KR | 20110056831 A | * | 5/2011 |
| KR | 10-2012-0055865 A | | 6/2012 |
| KR | 20120055865 A | * | 6/2012 |

* cited by examiner (a)

(b)

(c)

(d)

MOBILE TERMINAL WITH APPLICATION REEXECUTION

CROSS-REFERENCE TO RELATED APPLICATION

Pursuant to 35 U.S.C. § 119(a), this application claims the benefit of earlier filing date and right of priority to Korean Patent Application No. 10-2017-0001258 filed on Jan. 4, 2017, the contents of which are hereby incorporated by reference in its entirety.

BACKGROUND OF THE INVENTION

Field of the Invention

The present invention relates to a mobile terminal and, more particularly, to a mobile terminal capable of controlling the execution of an application more efficiently.

Discussion of the Related Art

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs. Efforts are ongoing to support and increase the functionality of mobile terminals. Such efforts include software and hardware improvements, as well as changes and improvements in the structural components.

As the functionality of the mobile terminal is diversified as described above, the number of touch inputs may be increased in executing the diversified functionalities through a conventional touch manipulation. Furthermore, a user cannot memorize all of types of page switching through touch inputs one by one because various pages are switched due to an increase of the number of touch inputs. Accordingly, there is a need to develop a technology capable of implementing various functions through a conventional touch manipulation using a simpler method.

SUMMARY OF THE INVENTION

Accordingly, an object of the present invention is to address the above-noted and other problems.

An object of the present invention is to provide a mobile terminal which provides a user interface that enables a user to control a mobile terminal easily and efficiently, and a method for controlling the mobile terminal.

An object of the present invention is to provide a mobile terminal which enables a user to enter a required screen using a more efficient and simpler method in an application for executing a plurality of functions through stepwise entry, and a method for controlling the mobile terminal.

An object of the present invention is to provide a mobile terminal which is capable of minimizing an unnecessary manipulation for entering a required screen by setting the required screen as an initial screen when an application is executed again after the application is terminated, and a method for controlling the mobile terminal.

An object of the present invention is to provide a mobile terminal which is capable of setting an initial screen according to the execution of each application using a simpler method even without executing each of a plurality of applications, and a method for controlling the mobile terminal.

A mobile terminal according to an aspect of the present invention includes a touch screen and a controller configured to display any one of a first screen set in the development stage of an application being executed, a second screen provided to the touch screen right before the application is terminated, and a third screen designated through a first predetermined input for at least one page provided through the application as an initial screen to be displayed on the touch screen in response to a re-execution of the application when the application is executed again after the application is terminated.

A mobile terminal according to another aspect of the present invention includes a touch screen, memory configured to stored at least one application, and a controller configured to display at least one setting mode which corresponds to the at least one application and in which an initial screen of the at least one application is set on the touch screen when initial screen setting mode for setting an initial screen to be displayed on the touch screen is entered in response to the execution of the at least one application and to set an initial screen for each application using the at least one setting mode.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (e.g., smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
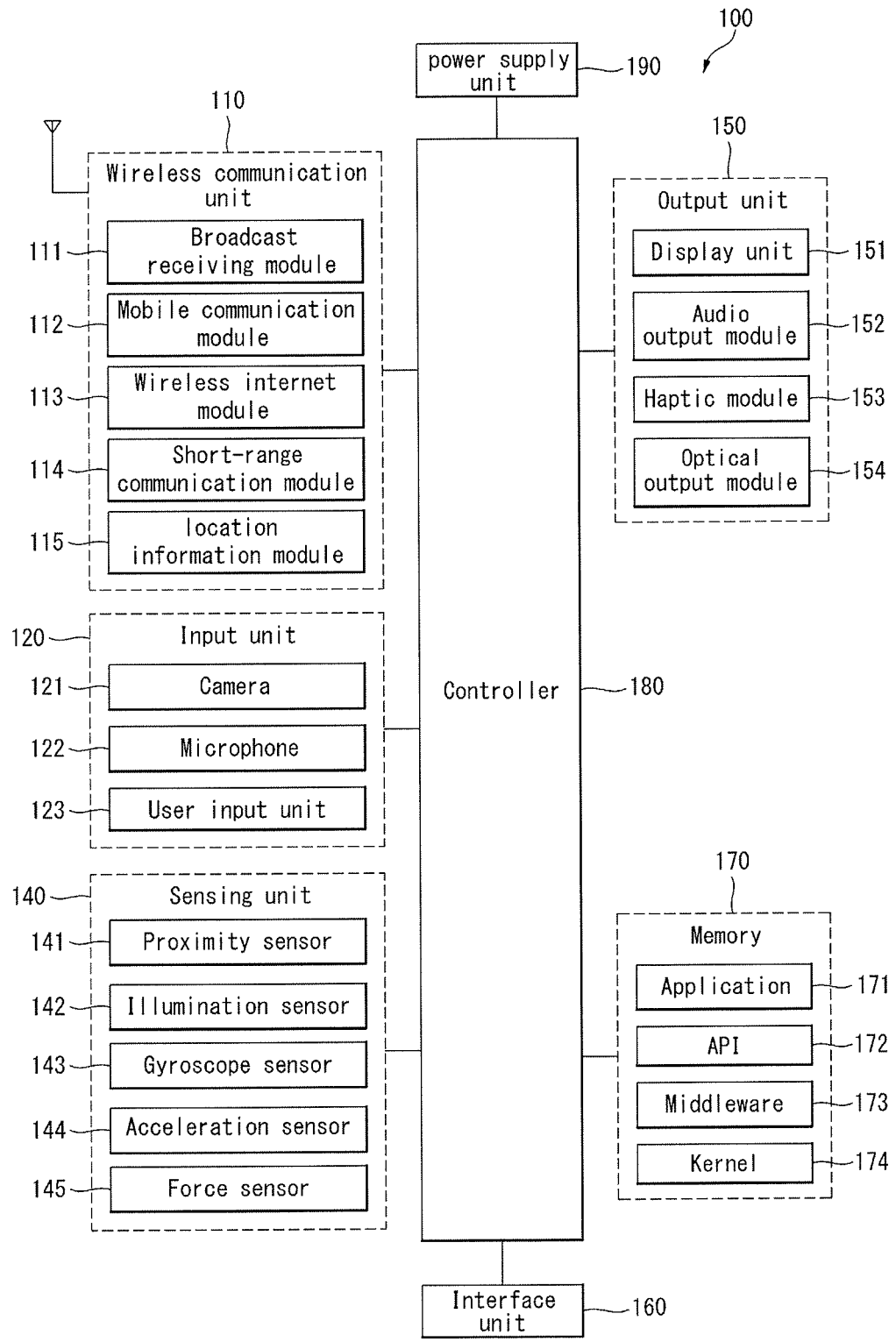
FIG. 1A is a block diagram of a mobile terminal in accordance with the present disclosure.

FIG. 1A is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (e.g., a touch key, a push key, a mechanical key, a soft key, and the like) for allowing a user to input information. Data (e.g., audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as proximity sensor (141), illumination sensor (142), a touch sensor, an acceleration sensor (144), a magnetic sensor, a G-sensor, a gyroscope sensor (143), a motion sensor, an RGB sensor, an infrared (IR) sensor, a force sensor (145), a finger scan sensor, a ultrasonic sensor, an optical sensor (e.g., camera 121), a microphone 122, a battery gauge, an environment sensor (e.g., a barometer, a hygrometer, a thermometer, a radiation detection sensor, a thermal sensor, and a gas sensor, among others), and a chemical sensor (e.g., an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that may be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (e.g., receiving a call, placing a call, receiving a message, sending a message, and the like). It is common for application programs to be stored in the memory 170, installed in the mobile terminal 100, and executed by the controller 180 to perform an operation (or function) for the mobile terminal 100. The memory 170 may include programming modules, such as an application 171, an application programming interface (API), middleware 173, and a kernel 174.

The kernel 174 may control and manage system resources (e.g., a bus, a processor, and memory) which are used to execute an operation or function implemented in the remaining programming modules, for example, the middleware 173, the API 172, and the application 171. The kernel 174 may access each element of the mobile terminal 100 in the middleware 173, the API 172 or the application 171 and provide an interface capable of controlling or managing the elements.

The middleware 173 may play the role of a mediator so that the API 172 or the application 171 can exchange data with the kernel 174 through communication with the kernel 174. Furthermore, the middleware 173 may perform load balancing for a task request using a method for assigning priority by which the system resources of the mobile terminal 100 can be used to at least one of applications, for example, in relation to task requests received from the application 171.

The API 172 is an interface in which the application 171 can control a function provided by the kernel 174 or the middleware 173, and may include at least one interface or function for file control, window control, image processing or text control, for example. In accordance with an embodiment of the present invention, when an initial screen according to the re-execution of an application is set, control may be performed so that the API 172 displays the set initial screen.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (e.g., Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution- Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is capable of exchanging data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. In this instance, a user of the wearable device may use the data processed in the mobile terminal 100 on the wearable device. For example, when a call is received in the mobile terminal 100, the user can answer the call using the wearable device. Furthermore, when a message is received in the mobile terminal 100, the user can check the received message using the wearable device.

The location information module 115 is typically configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input.

Image and video input is often obtained using one or more cameras 121. Such cameras 121 may process image frames of still pictures or video obtained by image sensors in a video or image capture mode. The processed image frames may be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is typically implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (e.g., a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. The virtual key or the visual key may be displayed on the touch screen in various shapes, for example, graphic, text, icon, video, or a combination thereof.

The sensing unit 140 is typically configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 may sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (e.g., distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor may sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is typically used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is typically configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is typically configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 may store programs to support operations of the controller 180 and store input/output data (e.g., phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Figure 1B:
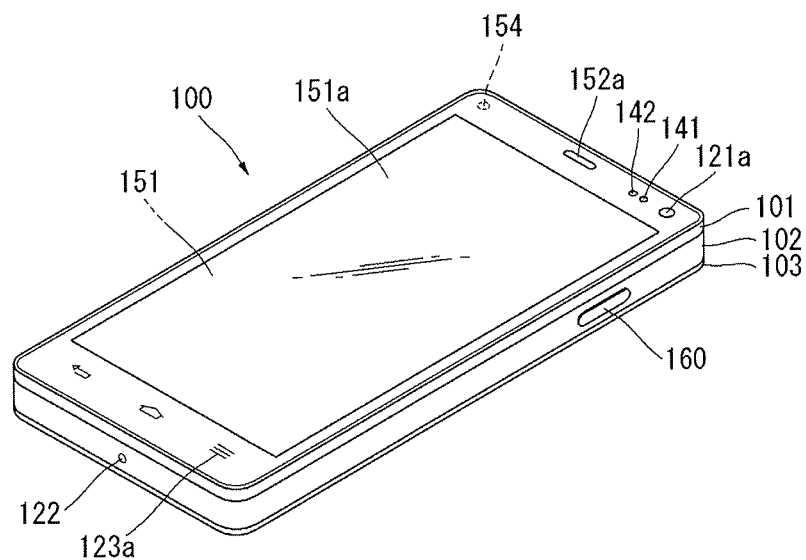
FIGS. 1B and 1C are conceptual views of one example of the mobile terminal, which are viewed in different directions.
Figure 1C:
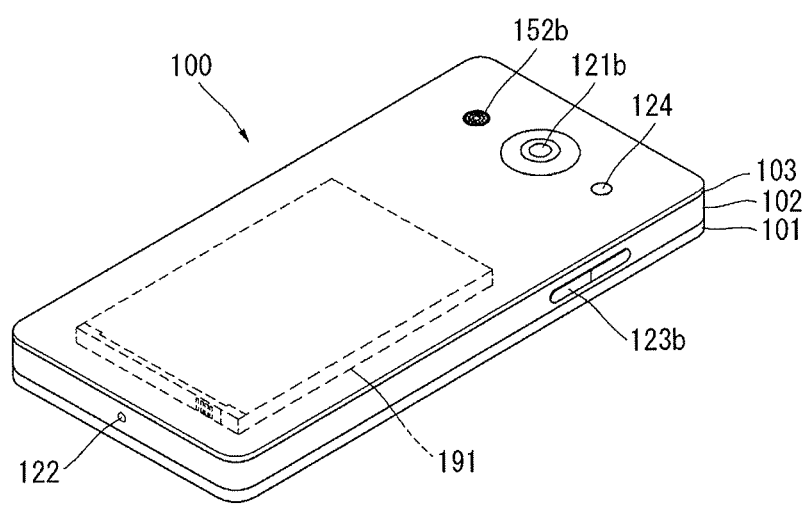

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (e.g., bar-type, watch-type, glasses-type, and the like). However, such teachings with regard to a particular type of mobile terminal will generally apply to other types of mobile terminals as well.

The mobile terminal 100 will generally include a case (e.g., frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal includes a display unit 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which may implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which may be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (e.g., a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 may be configured to output light for indicating an event generation. Examples of such events include a message reception, a call signal reception, a missed call, an alarm, a schedule notice, an email reception, information reception through an application, and the like. When a user has checked a generated event, the controller may control the optical output unit 154 to stop the light output.

The first camera 121a may process image frames such as still or moving images obtained by the image sensor in a capture mode or a video call mode. The processed image frames may then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit may be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit may be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 may have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (e.g., an earphone, an external speaker, or the like), a port for near field communication (e.g., an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b may include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b may be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Furthermore, the battery 191 may be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 may also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
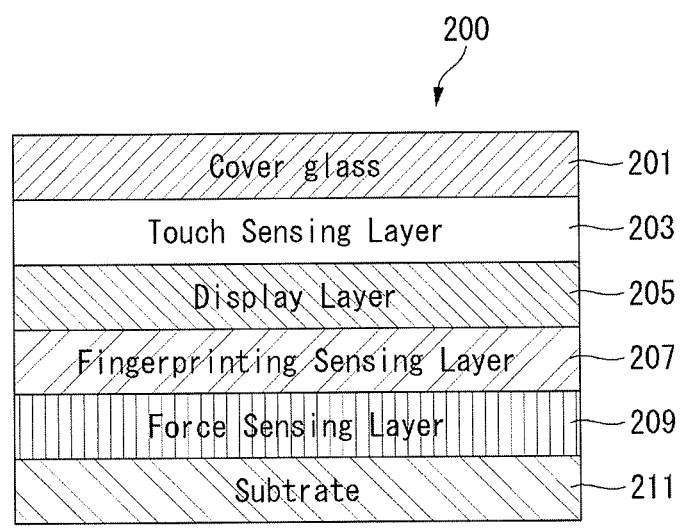
FIG. 2 is a diagram illustrating an example of the structure of a display stack according to an embodiment of the present invention.

Cover glass 201 at the top of a display stack 200 shown in FIG. 2 may correspond to the display unit 151 of FIG. 1B. The cover glass 201 may be made of a transparent material, glass, plastic or sapphire and function as an interface for receiving a touch input from a user and sensing the strength of a touch input. A user can manipulate the cover glass 201 using one or more fingers or a stylus. Further, a touch sensing layer 203 can sense a touch input to the cover glass 201. A capacitive, optical, ultrasonic or resistive touch sensing technology may be applied to the touch sensing layer.

In addition, a display layer 205 may be implemented in various forms including an LCD, an LED display and/or an OLED display. The display layer 205 can also be made of glass or have a glass substrate. Further, the touch sensing layer 203 may be implemented in combination with the display layer 205. A polarization plate, a color filter layer, etc. can also be additionally disposed between the touch sensing layer 203 and the display layer 205.

A fingerprinting sensing layer 207 senses the fingerprint of a user through a touch input to the cover glass 201. The fingerprinting sensing layer 207 may be equipped with a fingerprint sensor. For example, the fingerprint sensor may be implemented using a capacitive fingerprint sensor, an ultrasonic sensor, an optical sensor or a pyro-electric sensor. The fingerprint sensor may also be implemented in a dielectric element of a button form separately from the display stack 200 and be implemented in such a way as to capture fingerprint information.

A force sensing layer 209 is used to determine or estimate the amount of a force applied to the cover glass 201. A technology for sensing a capacitive, ultrasonic and piezoelectric force may be applied to the force sensing layer 209.

In accordance with an embodiment of the present invention, if both the fingerprint sensor and the force sensor are implemented using an ultrasonic sensing method, the fingerprinting sensing layer 207 and the force sensing layer 209 can sense the fingerprint of a user and the strength of a touch input at the same time using ultrasonic waves output by a single module.

In addition, a substrate layer 211 can form a support surface, such as a printed circuit board or a frame. The substrate layer 211 can also be configured to surround at least part of the sensors that form the touch sensing layer 203, the fingerprinting sensing layer 207, and the force sensing layer 209. As described above, the touch sensing layer 203 may include a touch sensor, the fingerprinting sensing layer 207 may include a fingerprint sensor, and the force sensing layer 209 may include a force sensor.

Figure 3:
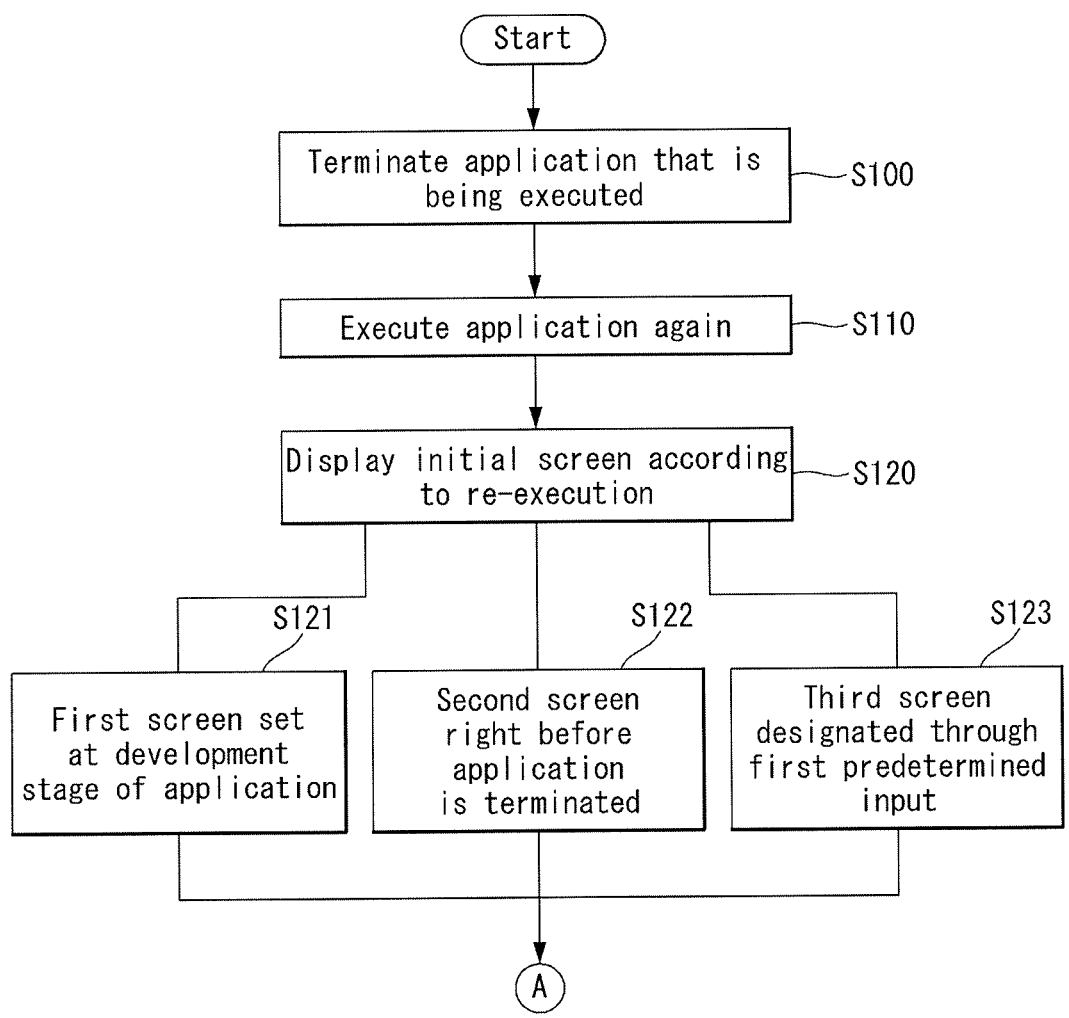
FIG. 3 is a flowchart illustrating a method for controlling a mobile terminal according to a first embodiment of the present invention.

Next, FIG. 3 is a flowchart illustrating a method for controlling a mobile terminal according to a first embodiment of the present invention. The method for controlling a mobile terminal according to the first embodiment of the present invention can be implemented in the mobile terminal described with reference to FIGS. 1A to 2.

Referring to FIG. 3, the controller 180 terminates an application that is being executed at step S100. The phrase "application that is being executed" can be divided into a first execution state (or foreground state) in which the execution screen of the application is activated and the application is displayed on the touch screen 151 and a second execution state (or background state) in which the execution screen of the application is not displayed on the touch screen 151, but the application is being executed in the background. That is, although the execution screen of any one of two or more applications is provided on the touch screen 151 while the two or more applications are executed in multi-tasking, all of the two or more applications may be executing.

In an embodiment of the present invention, the phrase "application that is being executed is terminated" corresponds to both the first execution state and second execution state of an application are terminated. Accordingly, when the application that is being executed is terminated, a system resources manager included in the kernel 174 can terminate the application that is being executed through a process of changing the application to the state in which any system resource is not allocated to the execution of the application by recovering system resources allocated to the application that is being executed.

For an application that is being executed in the background, system resources allocated to the application have not been fully recovered, and thus the application may be in the state in which at least part of the system resources have been allocated to the application and thus the execution state of the application is maintained. Accordingly, if the execution state of an application that is being executed in the background switches to the foreground state, the controller 180 can provide a screen of the last state that has been executed in the background to the touch screen 151 in foreground again without any change.

After the application that is being executed is terminated, the controller 180 can execute the application again at step S110. The controller 180 can also display an initial screen according to the re-execution of the application on the touch screen 151 at step S120. In this instance, the controller 180 can provide a first screen, set at the initial development stage of an application, as the initial screen according to the re-execution of the application at step S121.

Furthermore, the controller 180 can provide a screen activated right before the application that is being executed is terminated as the initial screen according to the re-execution of the application at step S122. In addition, if a third screen designated through a first predetermined input is present when the application is being executed, the controller 180 can provide the third screen as the initial screen according to the re-execution of the application at step S123.

That is, in accordance with the first embodiment of the present invention, any one of the first screen, the second screen, and the third screen can be provided to the touch screen 151 as an initial screen when the application that is being executed is executed again after the application is terminated. The first embodiment of the present invention is described below in more detail below with reference to FIGS. 4 to 6c.

Figure 4:
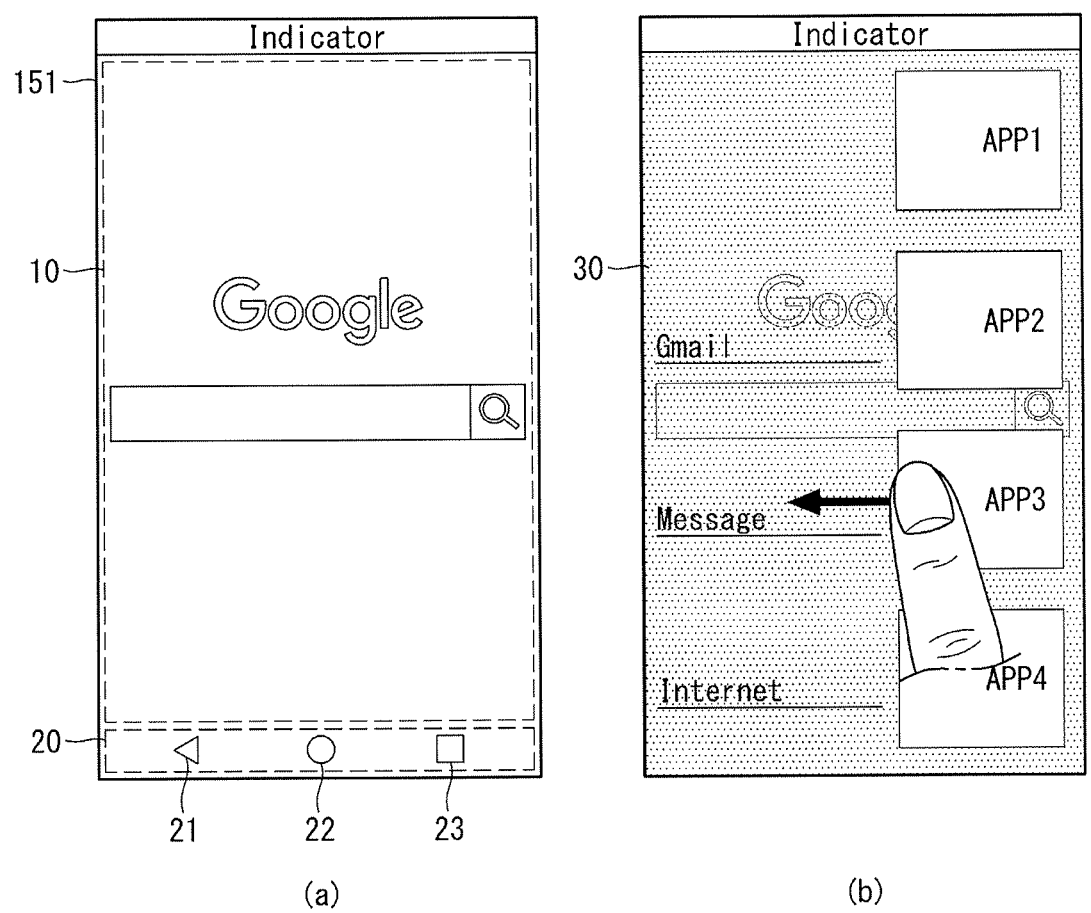
FIG. 4 is a diagram illustrating the state in which an application is being executed in accordance with the first embodiment of the present invention.

In particular, FIG. 4 is a diagram illustrating when an application is being executed in accordance with the first embodiment of the present invention. Referring to FIG. 4(a), when a specific application is executed, the controller 180 can display an application execution screen 10 to the touch screen 151. The controller 180 can control a screen displayed on the touch screen 151 through a control region 20 displayed in one region of the touch screen 151.

The control region 20 includes at least one key such as one of a first key 21 (or a back key) for returning to a screen of a previous step, a second key 22 (or a home key) for entering a home screen, and a third key 23 (or a recent app key) for displaying an application that is currently being executed. The control region is displayed on a touch pad in such a way as to respond to a touch input, but may be provided in a region on the lower side of the front body of the mobile terminal 100 so that it is physically distinguished from the touch screen 151. The control region can also be optionally displayed on the touch screen 151 in a soft key form.

The first key 21 is for providing a screen prior to a screen that is currently being displayed, and includes one or more depths. Accordingly, the first key 21 can provide a screen of a previous step in the execution screen of an application in which views may switch stepwise. The second key 22 is for entering a home screen on which at least one application, a widget, etc. implemented in the mobile terminal 100 are displayed other than the execution screen of an application. Furthermore, the third key 23 is capable of providing a plurality of applications that is being executed in the background on a single screen when the plurality of applications is being executed in a multi-tasking manner.

In accordance with an embodiment of the present invention, when an input for the first key 21 is received when the execution screen of a specific application has been displayed on the touch screen 151, a screen prior to the execution screen of the specific application is entered. If the execution screen of the specific application is a screen of the last step not having a screen of a previous step, the controller 180 can terminate the execution of the specific application in response to the input for the first key 21.

That is, the controller 180 can terminate an application that is being executed in foreground through the first key 21. In order to terminate an application that is being executed in the background, the controller 180 can display the application that is being executed in the background on the touch screen 151 and may terminate the application that is being executed after designating a specific application.

Referring to FIG. 4(b), when an input for the third key 23 is received, the controller 180 can display a first application to a fourth application APP1, APP2, APP3, and APP4 that are being executed in the background state on the touch screen 151. In this instance, an object displayed on the touch screen 151 may be an image (e.g., a thumbnail image) that is related to the execution of each of the first application to the fourth application that are being executed in the background state and that corresponds to a current screen. When an input for dragging an image corresponding to the specific application to the left is received, the controller 180 can terminate the execution state of the specific application by removing the dragged image from the touch screen 151 while moving the dragged image in the drag direction.

A method for providing at least one application that is being executed in the background to the touch screen 151 is not limited to the aforementioned example, but may be modified and implemented in various ways. Furthermore, an example in which the execution state of a specific application is terminated is not limited to the aforementioned example, but may be modified and implemented in various ways.

Figure 5:
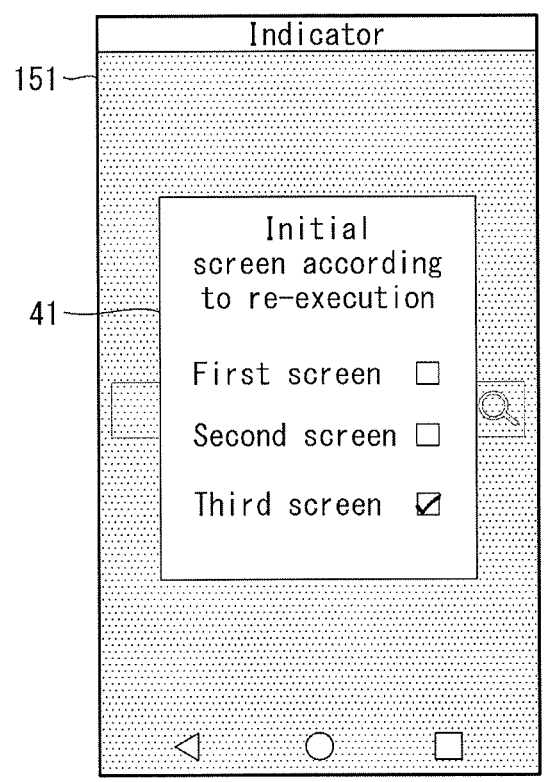
FIG. 5 is a diagram illustrating an example in which an initial screen according to the re-execution of an application is set after the application is terminated in accordance with the first embodiment of the present invention.

Next, FIG. 5 is a diagram illustrating an example in which an initial screen according to the re-execution of an application is set after the application is terminated in accordance with the first embodiment of the present invention. Referring to FIG. 5, in the first embodiment of the present invention, when a specific application is executed again after the execution of the specific application is terminated, an initial screen that is first provided to the touch screen 151 is provided as any one of a first screen, a second screen, and a third screen.

The controller 180 can determine any one of the first screen to the third screen to be the initial screen according to the re-execution of the application in response to the selection of a user. For example, the selection of the user can be performed through a pop-up window 41 for selecting any one of the first screen to the third screen.

When a predetermined input for an application icon displayed on a home screen is received before an application is executed, the controller 180 can provide the pop-up window 41. In this instance, the predetermined input is a force touch. If a touch input for the application icon exceeds specific threshold strength, the controller 180 can provide the pop-up window 41 around the application icon without directly executing the application. Furthermore, the controller 180 can receive an input for selecting any one of the first screen to the third screen when the pop-up window 41 has been displayed.

While the execution screen of an application is displayed on the touch screen 151 after executing the application, the controller 180 can provide the pop-up window 41 to the touch screen 151. That is, the controller 180 can set an initial screen according to the re-execution of the application after terminating the application when the application has been executed.

When an input for terminating an application is received, the controller 180 can provide the pop-up window 41 before the application is terminated, and may terminate the application when the setting of an initial screen according to the re-execution of the application through the pop-up window 41 is completed.

Figure 6A:
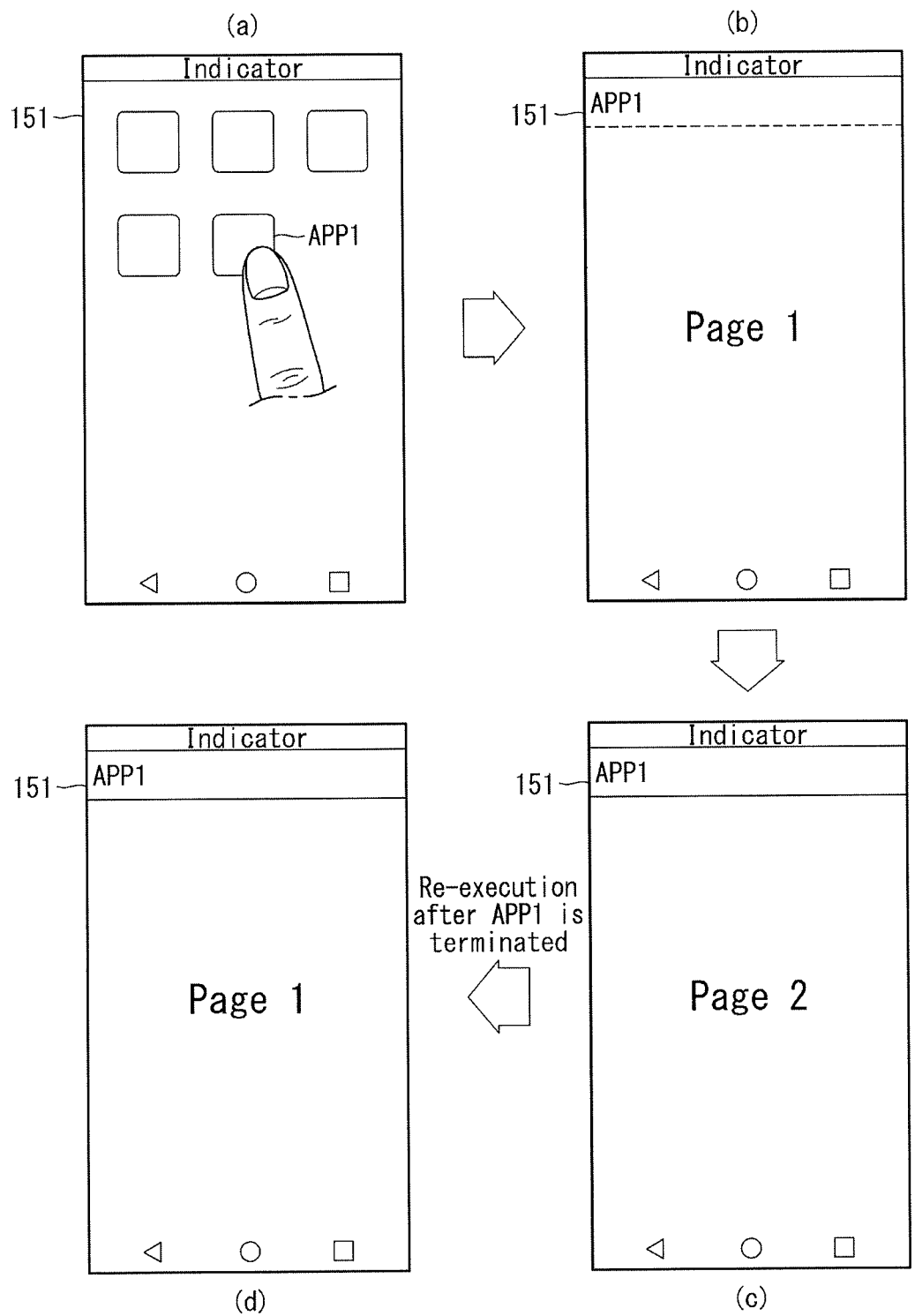
FIGS. 6A to 6C are diagrams illustrating an example in which an initial screen according to the re-execution of an application after the application is terminated is entered in accordance with the first embodiment of the present invention.
Figure 6B:
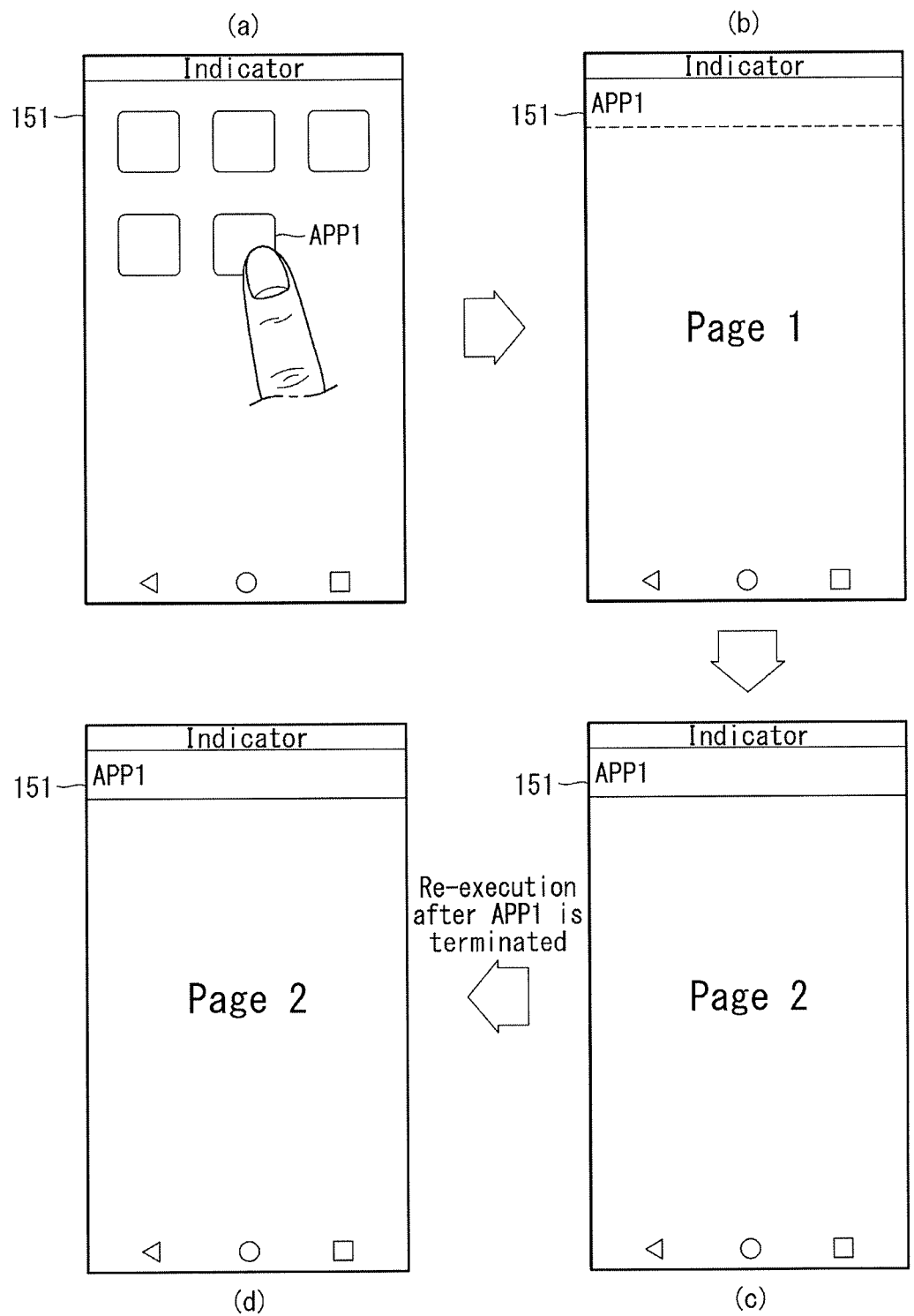
Figure 6C:
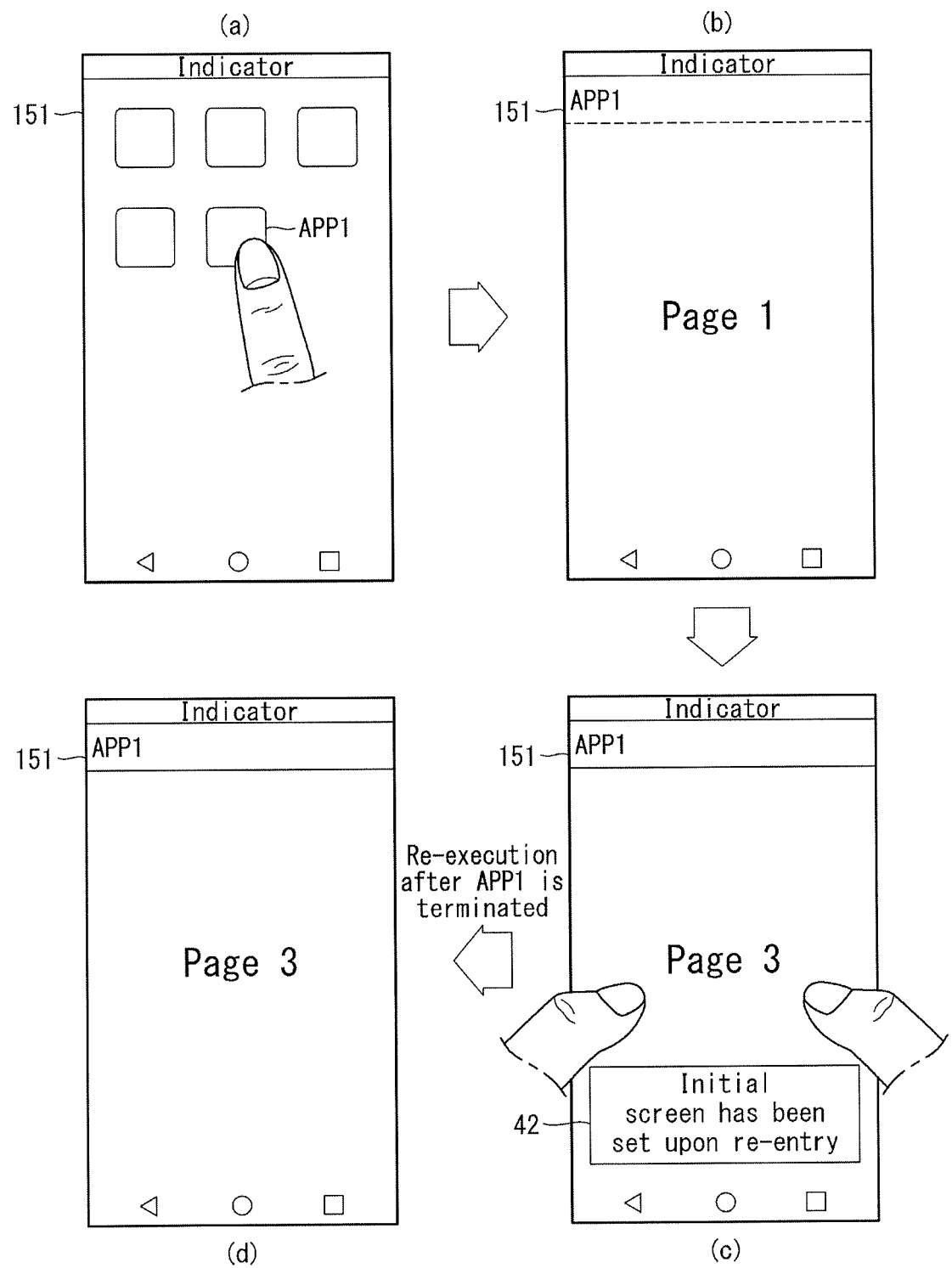

Next, FIGS. 6A to 6C are diagrams illustrating an example in which an initial screen according to the re-execution of an application after the application is terminated is entered in accordance with the first embodiment of the present invention. Referring to FIG. 6A, when an input for selecting a first application icon APP1 is received, the controller 180 can display a first page on the touch screen 151 in response to the execution of a first application. The first application may be terminated when a second page provided by the first application through a touch manipulation has been displayed on the touch screen 151.

Thereafter, when the first application is executed again, the controller 180 can provide the first page as an initial screen. That is, the first page is a screen set as a default value at the initial development stage of the first application. For example, if the first application is a webpage, a specific URL may be set as the initial screen. In this instance, whenever the webpage is executed, a page corresponding to a predetermined specific URL may be provided to the touch screen 151. The page corresponding to the predetermined specific URL is a page provided by an external server, and a page updated in real time not the same page may be provided.

Referring to FIG. 6B, if a page (e.g., a second page) displayed on the touch screen 151 right before a first application is terminated is set as an initial screen according to the re-execution of an application, that is, when the first application APP1 that is being executed is executed again after the first application APP1 is terminated, the controller 180 can provide a second page Page 2 as a screen that is initially entered.

If a page right before the first application is terminated is provided to the touch screen 151 as a scrollable page, the controller 180 can specify a location that belongs to the page and that is indicated in the touch screen 151 right before the first application is terminated, and may display a page including the corresponding location on the touch screen 151.

Referring to FIG. 6C, when a third page Page 3 has been provided to the touch screen 151 by a touch manipulation of a user after the first application APP1 is executed and thus the first page Page 1 is displayed on the touch screen 151, and when a predetermined touch input for setting an initial screen according to the re-execution of an application is received, the controller 180 can set the third page Page 3 as an initial screen according to the re-execution of the application.

When the first application APP1 that is being executed is executed again after the first application APP1 is terminated, the controller 180 can provide the third page Page 3 to the touch screen 151 as an initial screen. Further, the predetermined touch input may include an input for receiving a second force touch on a second edge area on the right side when a first force touch on a first edge area that belongs to a region in which the third page Page 3 has been displayed and that is located on the left side has been received.

If the first force touch and the second force touch are received at the same time or received at the substantially same point of time, the controller 180 can recognize such touches as a command for setting the third page an initial screen according to the re-execution of an application. If each of the first force touch and the second force touch is detected as exceeding specific threshold strength, the controller 180 can provide tactile feedback to a user by controlling the haptic module so that a haptic signal is output through the haptic module. Accordingly, the user can be aware that an initial screen according to the re-execution of an application has been normally set.

The controller 180 can provide a pop-up window 42, providing notification that an initial screen according to the re-execution of an application has been set, to the touch screen 151. The first force touch and the second force touch are only illustrative, and an input for setting an initial screen according to the re-execution of an application may be modified and implemented in various ways. A method for setting an initial screen according to the re-execution of an application by applying a force touch is described below in more detail in connection with a second embodiment of the present invention.

Figure 7:
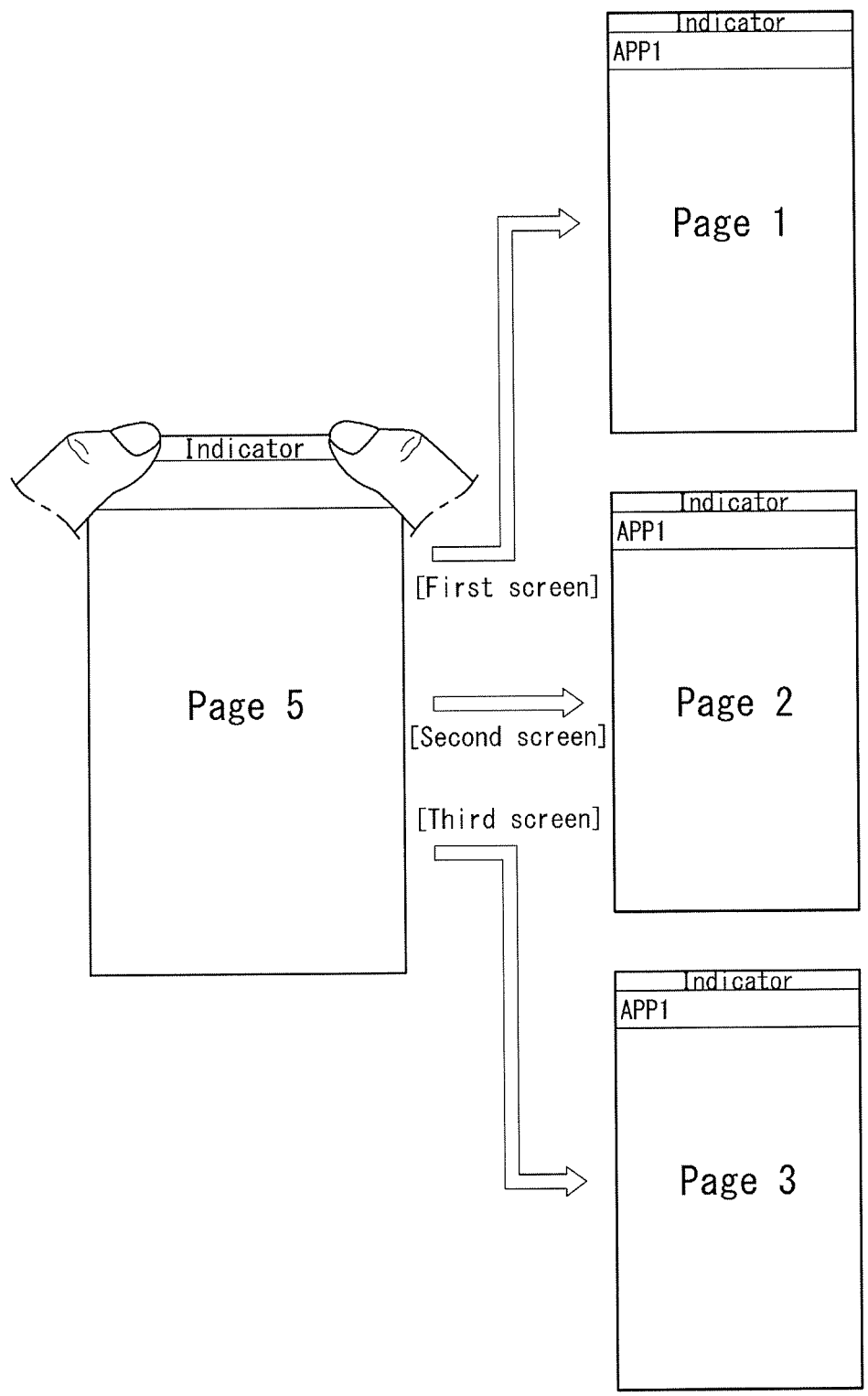
FIG. 7 is a diagram illustrating another example in which an initial screen according to the re-execution of an application is displayed in accordance with the first embodiment of the present invention.

Next, FIG. 7 is a diagram illustrating another example in which an initial screen according to the re-execution of an application is displayed in accordance with the first embodiment of the present invention. Referring to FIG. 7, the controller 180 can check an initial screen according to the re-execution of an application when a fifth page Page 5 of a plurality of pages provided through a first application APP1 has been provided to the touch screen 151. For example, when the aforementioned predetermined inputs (i.e., the first force touch and the second force touch) are received with respect to the indicator area of the touch screen 151, the controller 180 can provide a screen that belongs to the first screen (Page 1), the second screen (Page 2), and the third screen (Page 3) and that has been set as an initial screen according to the re-execution of an application to the touch screen 151.

When the predetermined input for the indicator area is received, the controller 180 can display a thumbnail image, corresponding to the initial screen according to the re-execution of the application, on the current page Page 5. If the first screen has been set as an initial screen according to the re-execution of an application, the controller 180 can change the initial screen into the third screen through the aforementioned predetermined input.

Figure 8:
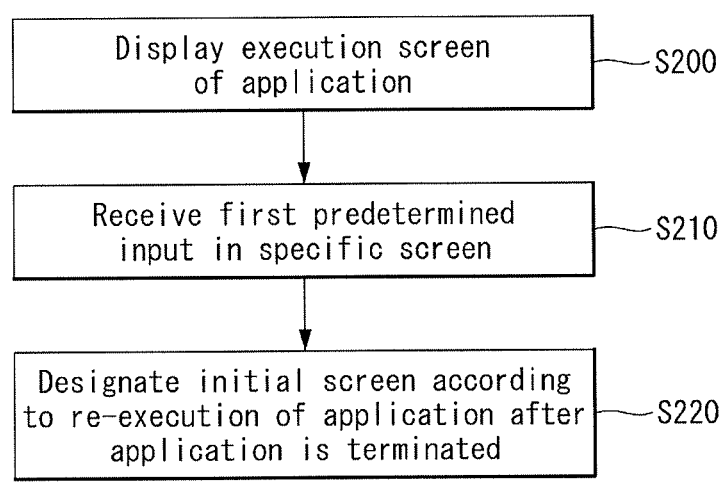
FIG. 8 is a flowchart illustrating a method for controlling a mobile terminal according to a second embodiment of the present invention.
Figure 9:
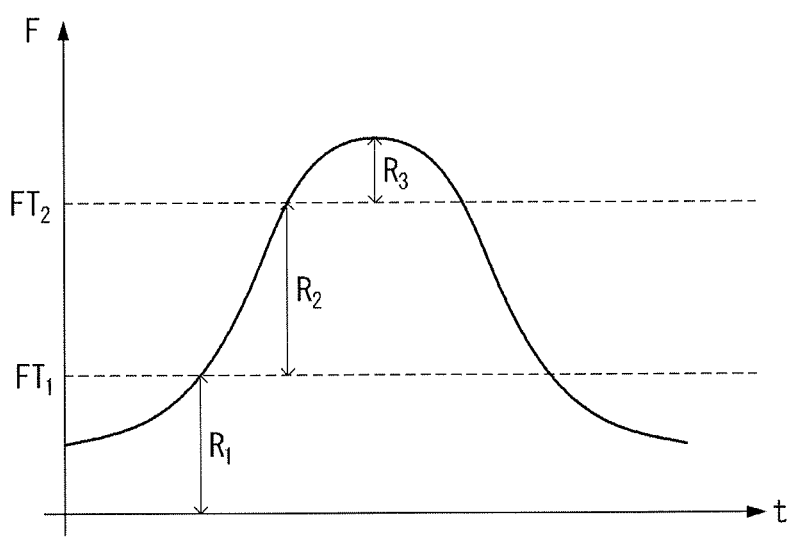
FIG. 9 is a diagram illustrating an example of an initial screen according to the re-execution of an application using a force touch.

FIG. 8 is a flowchart illustrating a method for controlling a mobile terminal according to a second embodiment of the present invention, and FIG. 9 is a diagram illustrating an example of an initial screen according to the re-execution of an application using a force touch. The method for controlling a mobile terminal according to the second embodiment of the present invention may be implemented in the mobile terminal described with reference to FIGS. 1A to 2.

Referring to FIG. 8, the controller 180 can display the execution screen of an application on the touch screen 151 at step S200, and receive a first predetermined input in a specific screen provided by the application at step S210. When the application that is being executed is executed again after the application is terminated, the controller 180 can designate the specific screen as an initial screen according to the re-execution of the application at step S220.

The first predetermined input is an input for setting the specific screen as an initial screen according to the re-execution of the application. When the input is received, the controller 180 can store information for browsing the specific screen in the memory 170, and may fetch the specific screen as an initial screen based on the stored information through an application processor (AP) when an application is executed again in the future. The information for browsing the specific screen may be implemented in a function of the application manager of the middleware 173.

Referring to FIG. 9, the first predetermined input for setting an initial screen according to the re-execution of an application may include a force touch input. The force touch input is an input for performing a predetermined function based on the strength of a touch input sensed by the force sensor, and may be different from a common touch input.

For example, the strength of a touch input for a first application icon APP1 may be increased over time. If the strength of a touch input is less than first threshold strength FT1 (R1), that is, if a touch is released before the first threshold strength FT1 is exceeded (R1) after the touch (or including when a touch strength is not increased after the touch input is received), the controller 180 can receive the touch input as a common touch input and may perform control so that a corresponding first application is executed.

If the strength of the touch input exceeds the first threshold strength FT1 and is detected as being less than second threshold strength FT2, the controller 180 can recognize such a touch as a command for setting an initial screen according to the re-execution of an application. If the strength of the touch input exceeds the second threshold strength FT2, the controller 180 can execute an item corresponding to the touch input point.

Next, FIGS. 10A to 14 are diagrams illustrating a second embodiment of the present invention. In the second embodiment of the present invention, a process for setting an initial screen according to the re-execution of an application is described according to the type of each application. The reason for this is that information provided through an application, a method for providing the information, etc. may be different according to the type of application.

Figure 10A:
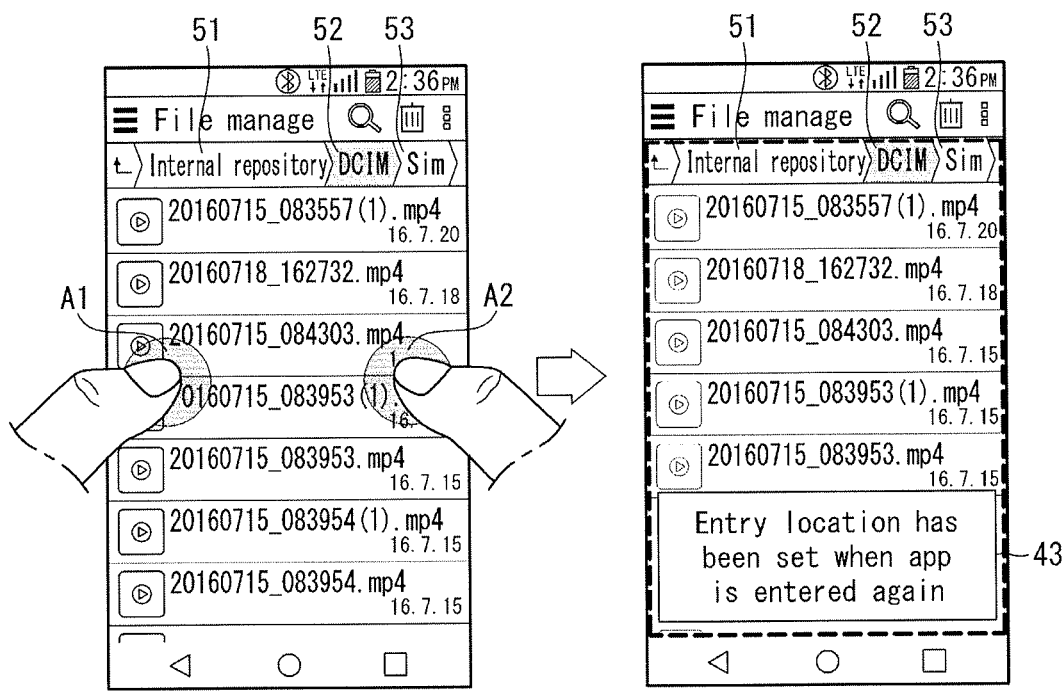
FIGS. 10A to 14 are diagrams illustrating a second embodiment of the present invention.

Referring to FIG. 10A, the controller 180 can execute a file manager application. The file manager application can sort and store specific content, stored in the memory 170, by folder. For example, the file manager application can manage files stored in the mobile terminal 100 through an internal repository folder 51, a data center infrastructure management (DCIM) folder 52, and an SIM folder 53, for example. When the item of the DCIM folder 52 is selected when the file manager application has been executed, the controller 180 can display at least one media content list, managed through the DCIM folder 52, on the touch screen 151.

When the predetermined inputs (i.e., the first force touch and the second force touch) are received when a content list managed through the DCIM folder 52 has been displayed on the touch screen 151, the controller 180 can designate an initial screen, provided when the file manager application is executed again, as the DCIM folder 52.

The DCIM folder 52 is a folder for storing photos, moving images, etc. captured through the camera of the mobile terminal 100. A user can access media content obtained through the camera more easily by executing the file manager application. When the designation of the initial screen is completed through the predetermined inputs, the controller 180 can notify a user of the designation through a pop-up window 43.

That is, in accordance with the second embodiment of the present invention, in order to display required information on the touch screen 151 through a specific application, at least one of a plurality of folders that are grouped and managed according to a specific category and/or a plurality of folders having a depth structure may need to be entered. In this instance, an initial screen according to the re-execution of an application can be set using a simpler method through the predetermined inputs when data provided through a specific folder of the plurality of folders has been displayed on the touch screen 151.

Figure 10B:
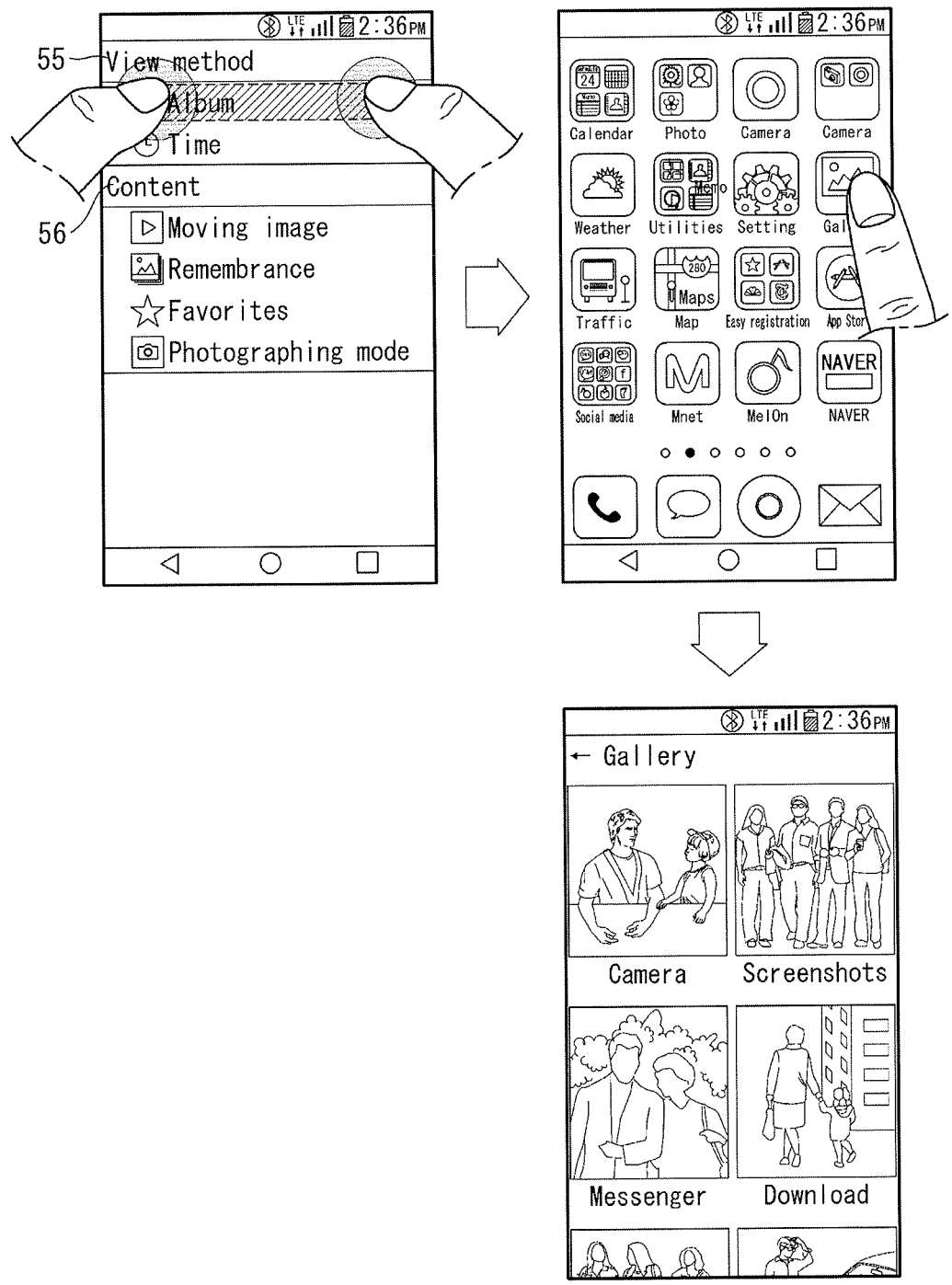

Referring to FIG. 10B, the controller 180 can execute a gallery application, content provided through the gallery application can be grouped for each specific category, and image content stored in the memory 170 can be displayed on the touch screen 151. For example, regarding a criterion for the grouping, a method for providing the stored image content to a user can be different depending on a method 55 for visualizing the stored image content and the type 56 of stored image content.

For example, the view method 55 of the image content may include a view for each album and a view for each time. In the view for each album, the image content is visualized for each categorized album and provided. In the view for each time, the image content is categorized for each generated time and provided. Furthermore, the type of provided image content may include the type of generated image (e.g., a moving image and a still image), a tag (e.g., favorites) designated to a generated image, and mode in which photographing mode is directly entered by executing a camera application and a real-time photographing image is captured.

When the predetermined inputs are received with respect to an album view menu of the view method of the image content, the controller 180 can provide an initial screen according to the re-execution of the gallery application in album view mode. A category provided in the album view mode may be based on a source from which an image is generated or downloaded.

Accordingly, in accordance with the second embodiment of the present invention, if a user executes the gallery application and sets the most frequently used function as an initial screen, inconvenience in which the gallery application has to be entered through repetitive depths whenever the gallery application is executed can be removed.

Figure 11:
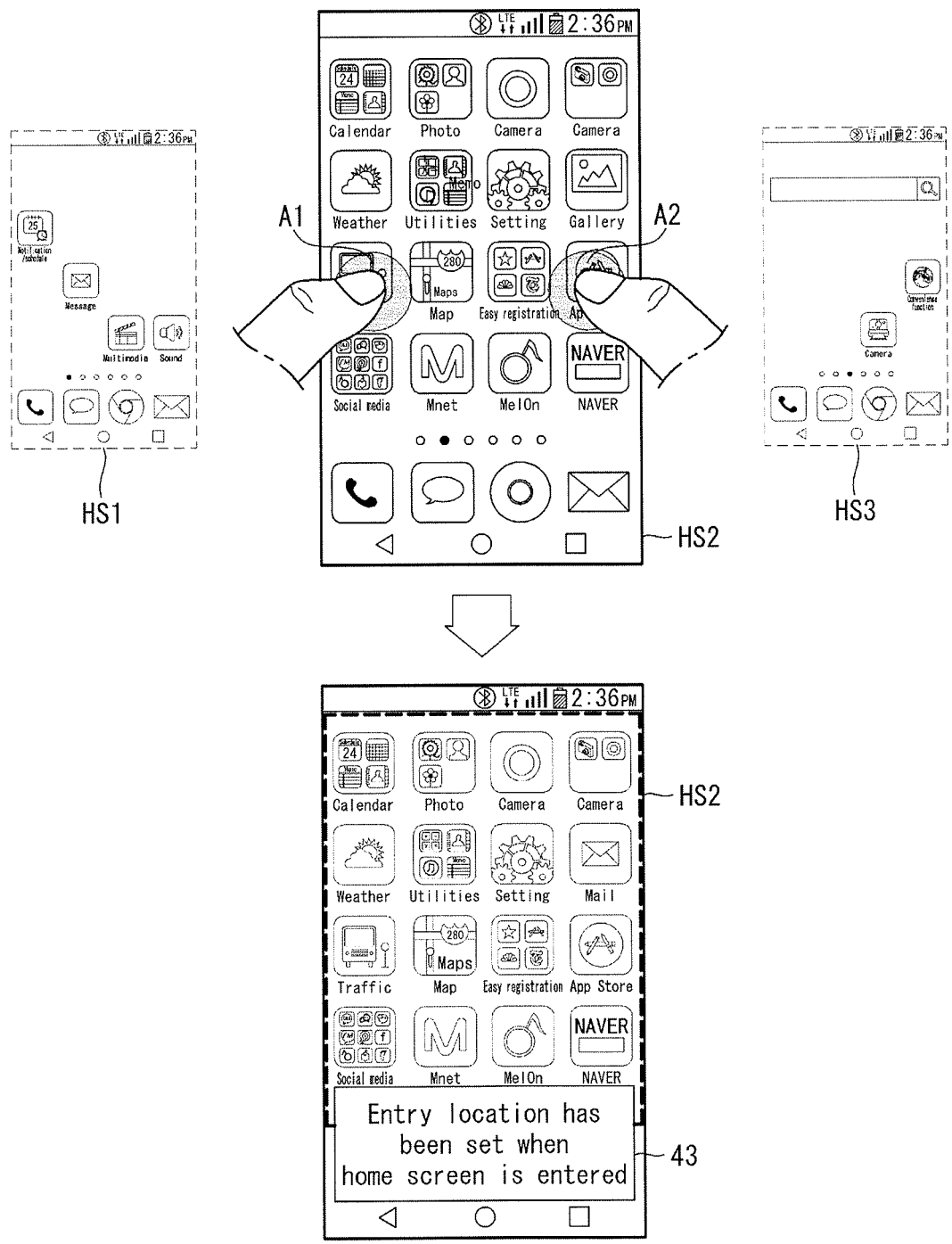

Referring to FIG. 11, the second embodiment of the present invention can also be applied to a home screen. In more detail, the home screen is first provided when the display of the mobile terminal 100 is powered on. Furthermore, the home screen may be first provided after a lock state is released if the mobile terminal 100 has been set as the lock state. The home screen may also be provided as a plurality of pages because the touch screen 151 has a limited size. That is, the controller 180 can display any one of a first home screen HS1, a second home screen HS2, and a third home screen HS3 on the touch screen 151 through a flicking input to the touch screen 151.

When predetermined inputs (i.e., a first force touch and a second force touch) are received with respect to the second home screen HS2, the controller 180 can set the second home screen HS2 as the initial entry location of the home screen. A home screen may be provided when an input for a home button (e.g., a hard key provided at the front of the body or a soft key displayed on the touch screen) is received unlike in the re-execution of an application. Accordingly, when an input for the home button is received regardless of a screen displayed on the touch screen 151, the controller 180 can enter a designated home screen.

Figure 12:
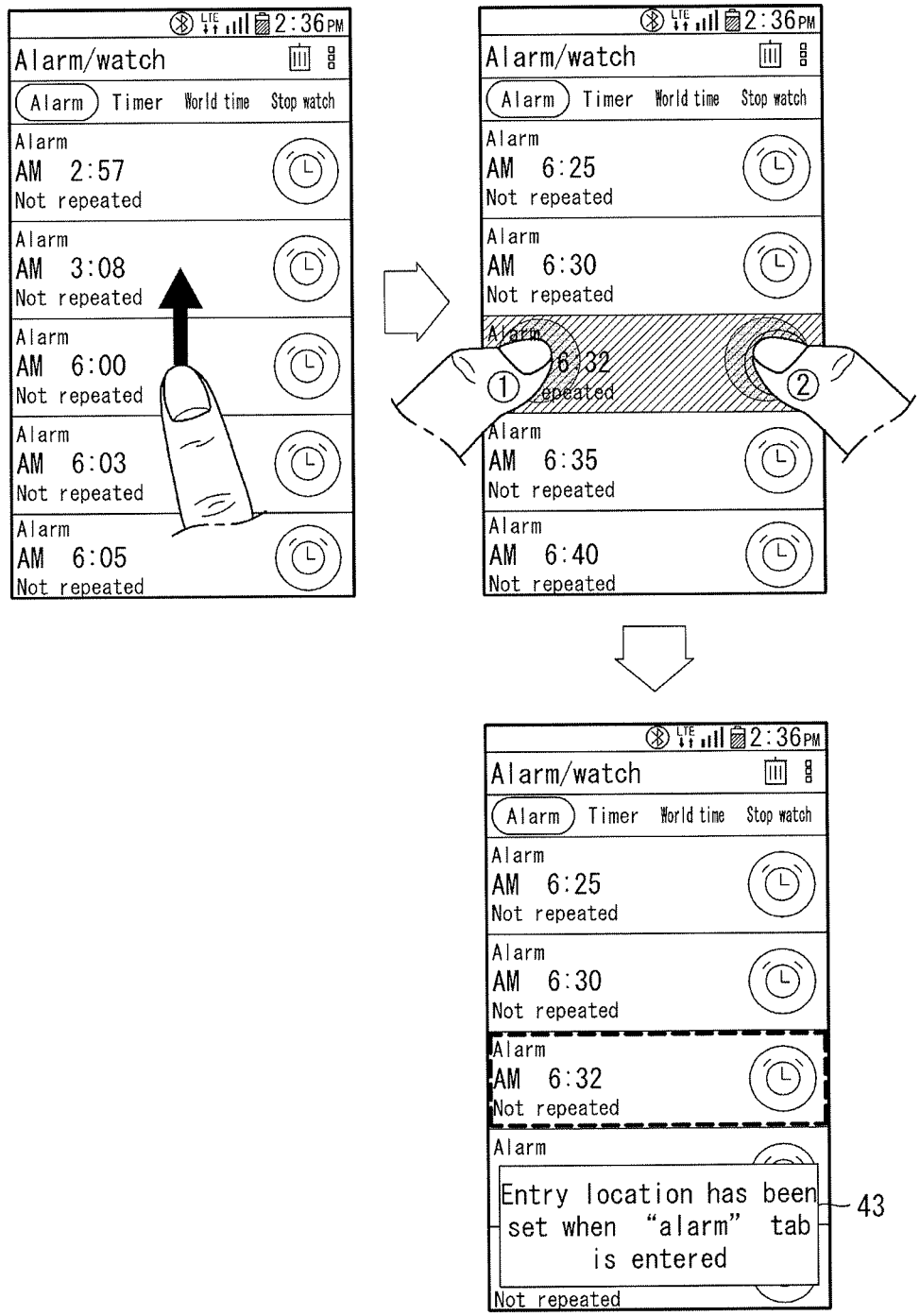

Referring to FIG. 12, the second embodiment of the present invention can be applied to scrollable data. The controller 180 can display, on the touch screen 151, a list including at least one piece of data that may be scrolled. Only at least part of the at least one piece of data may be displayed on the touch screen 151 and the remaining part may be displayed on the touch screen 151 through a user's scroll manipulation due to a limit to the size of the touch screen 151.

The second embodiment of the present invention can be applied to an application that provides the at least one piece of scrollable data regardless of the type of application. For example, the application may include an alarm application. When a predetermined input for any one piece of the scrollable data is received, the controller 180 can set a page in which the data is displayed on the touch screen 151 as an initial screen according to the re-execution of an application. In this instance, the predetermined input may include a first force touch and a second force touch on both ends of the data.

That is, in the second embodiment of the present invention, when an application for displaying scrollable data is executed, the location of data displayed on the touch screen 151 can be designated through a predetermined input. Accordingly, data to be provided to a user by the execution of an application can be directly provided to the user even without an additional scroll operation.

In FIG. 12, functions provided by the alarm application may be classified into various tabs (e.g., an alarm, a timer, a world time, and stop watch) and provided. In the aforementioned example, when an input for selecting an alarm tab is received, the controller 180 does not provide the top of scrollable data, but displays data designated through the predetermined input on the touch screen 151. Accordingly, data that belongs to the scrollable data and that is displayed at the top of the touch screen 151 may not be the first data of the scrollable data.

Figure 13:
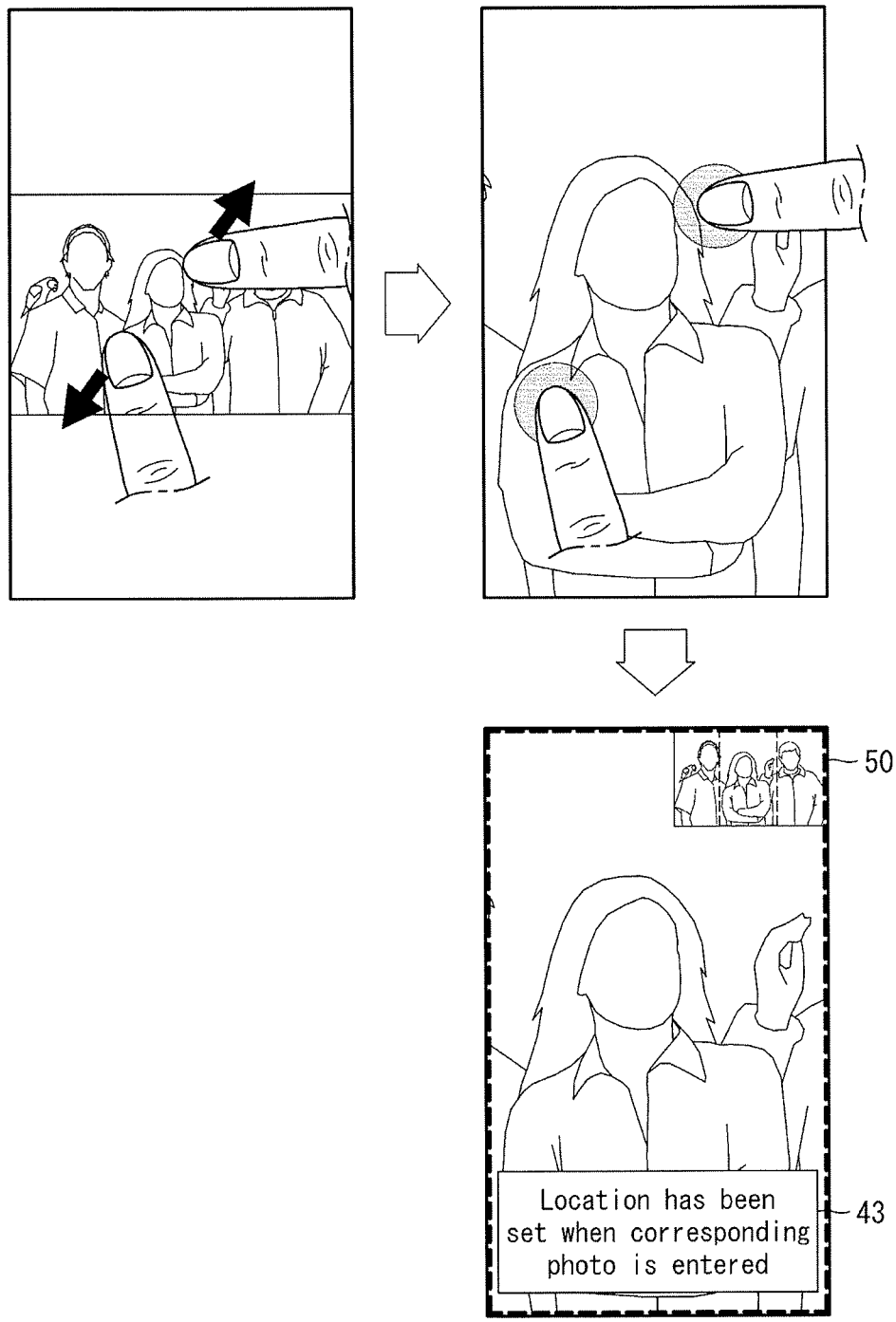

Referring to FIG. 13, the second embodiment of the present invention can be applied to an image. For example, if an input for selecting a specific image by executing a gallery application is received, the specific image is commonly provided through a full view. However, when the predetermined inputs (i.e., the first force touch and the second force touch) are received when a specific part of the specific image provided through the full view has been magnified, the controller 180 can set an image of the magnified state as an initial entry image.

When an input for opening the specific image is received again, the controller 180 can display the image of the zoom-in state on the touch screen 151. The controller 180 can also display a thumbnail image 50, corresponding to the image of the original size of the specific image, on the touch screen 151.

Furthermore, the second embodiment of the present invention can also be applied to an operation for setting a zoom-out image as an initial screen in addition to a zoom-in image as described above. For example, in the second embodiment of the present invention, when the predetermined inputs for a playback screen at a specific point of time while a moving image is played back in addition to a still image are received, the controller 180 can set the specific point of time as an initial screen provided when a moving image is played back.

The moving image is provided through a plurality of frames according to the playback time. If a plurality of frames at a point of time at which the predetermined inputs are received is set, the controller 180 can provide a thumbnail image of the plurality of frames along with a moving image playback screen. In this instance, a designated frame may be tagged on the moving image in a bookmark form.

Figure 14:
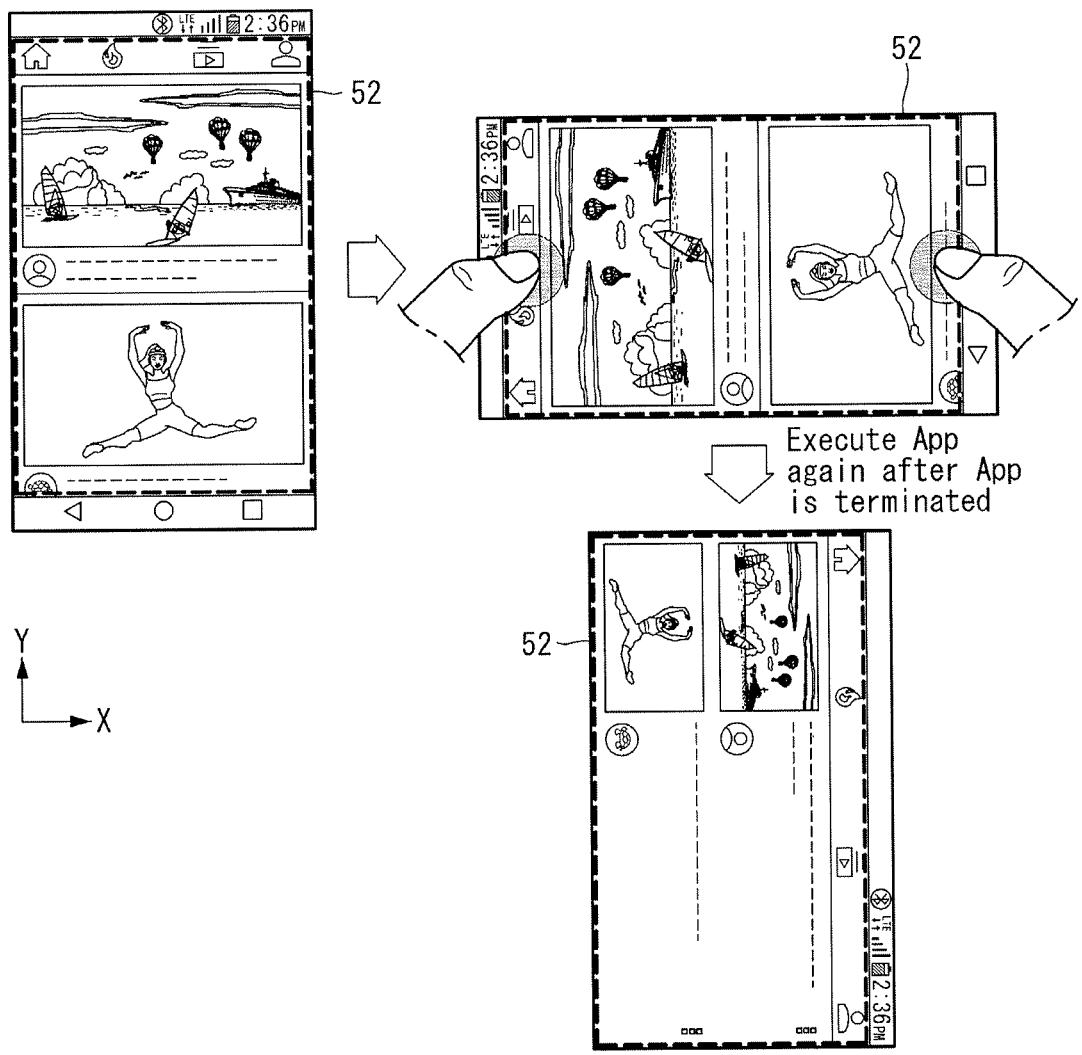

Referring to FIG. 14, the second embodiment of the present invention can be applied in association with a screen switch process according to a change in the posture of the mobile terminal 100. The mobile terminal 100 includes a posture detection sensor, and can sense a posture of the mobile terminal 100 through the posture detection sensor. For example, the controller 180 can basically divide a posture of the mobile terminal 100 into portrait mode and landscape mode through the posture detection sensor.

Furthermore, if an automatic screen switchover function has been set, the controller 180 can selectively display a portrait mode screen and a landscape mode screen in response to a change in the posture of the mobile terminal 100. In this instance, if the automatic screen switchover function is not set although the posture detection sensor has been enabled, the controller 180 can not perform switchover between the portrait mode screen and the landscape mode screen in response to a change in the posture of the mobile terminal 100.

Referring to FIG. 14, the controller 180 can set an initial screen by taking into consideration a posture of the mobile terminal 100 at a point of time at which the initial screen according to the re-execution of an application is set. For example, when a posture of the mobile terminal 100 is a landscape mode, a screen display state can be applied to an initial screen without any change. Accordingly, after the mobile terminal 100 switches from portrait mode to landscape mode when the automatic screen switchover function has not been set, and when predetermined inputs (i.e., a first force touch and a second force touch) for a screen provided in the landscape mode are received, the controller 180 sets the screen itself provided in the landscape mode as an initial screen according to the re-execution of an application. Accordingly, the screen provided in the landscape mode can be displayed on the touch screen 151 as the initial screen regardless of a posture of the mobile terminal 100 when the application is subsequently executed again.

Figure 15A:
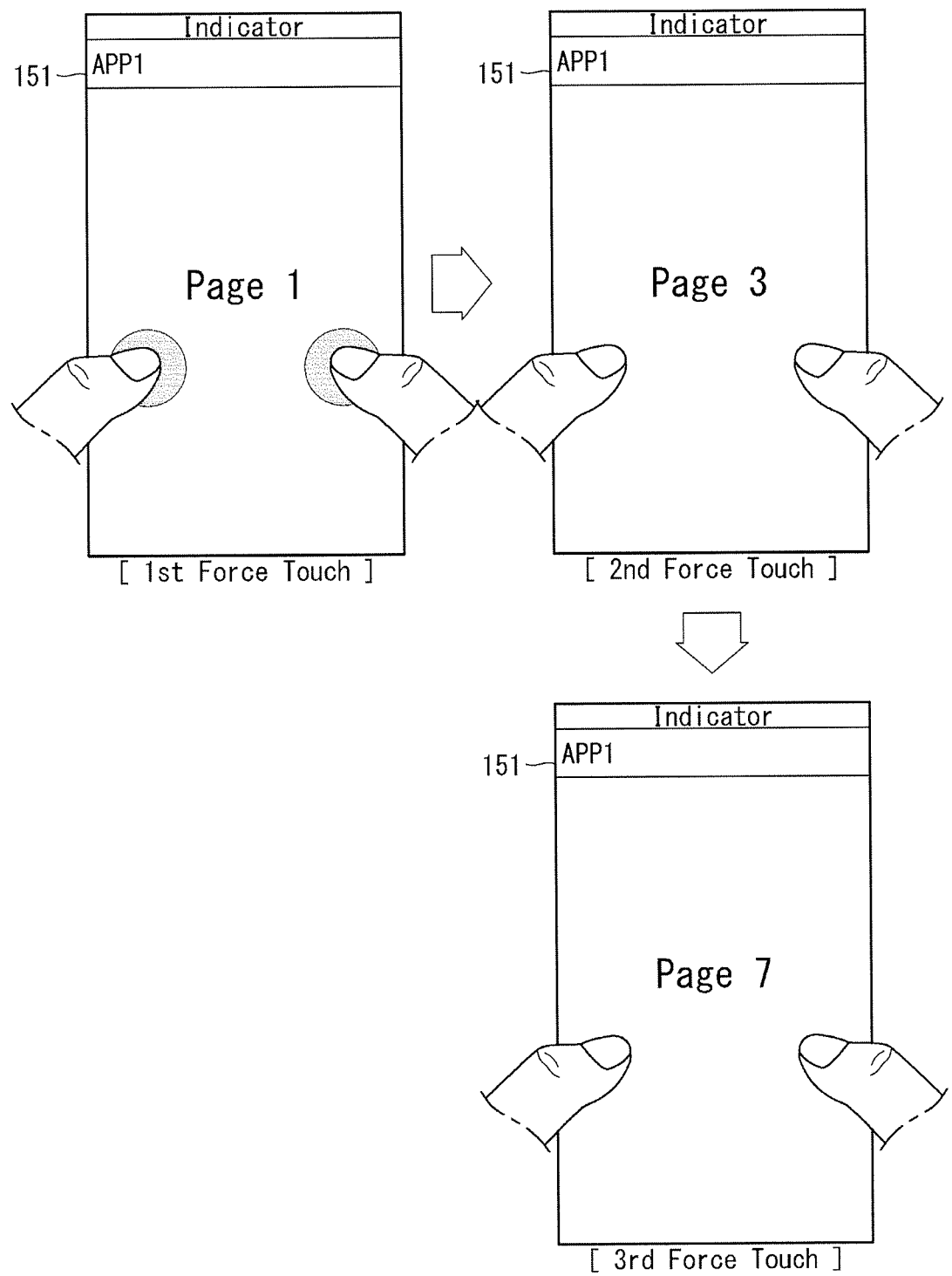
FIGS. 15A and 15B are diagrams illustrating another example in which an initial screen according to the re-execution of an application is set in accordance with the second embodiment of the present invention.
Figure 15B:
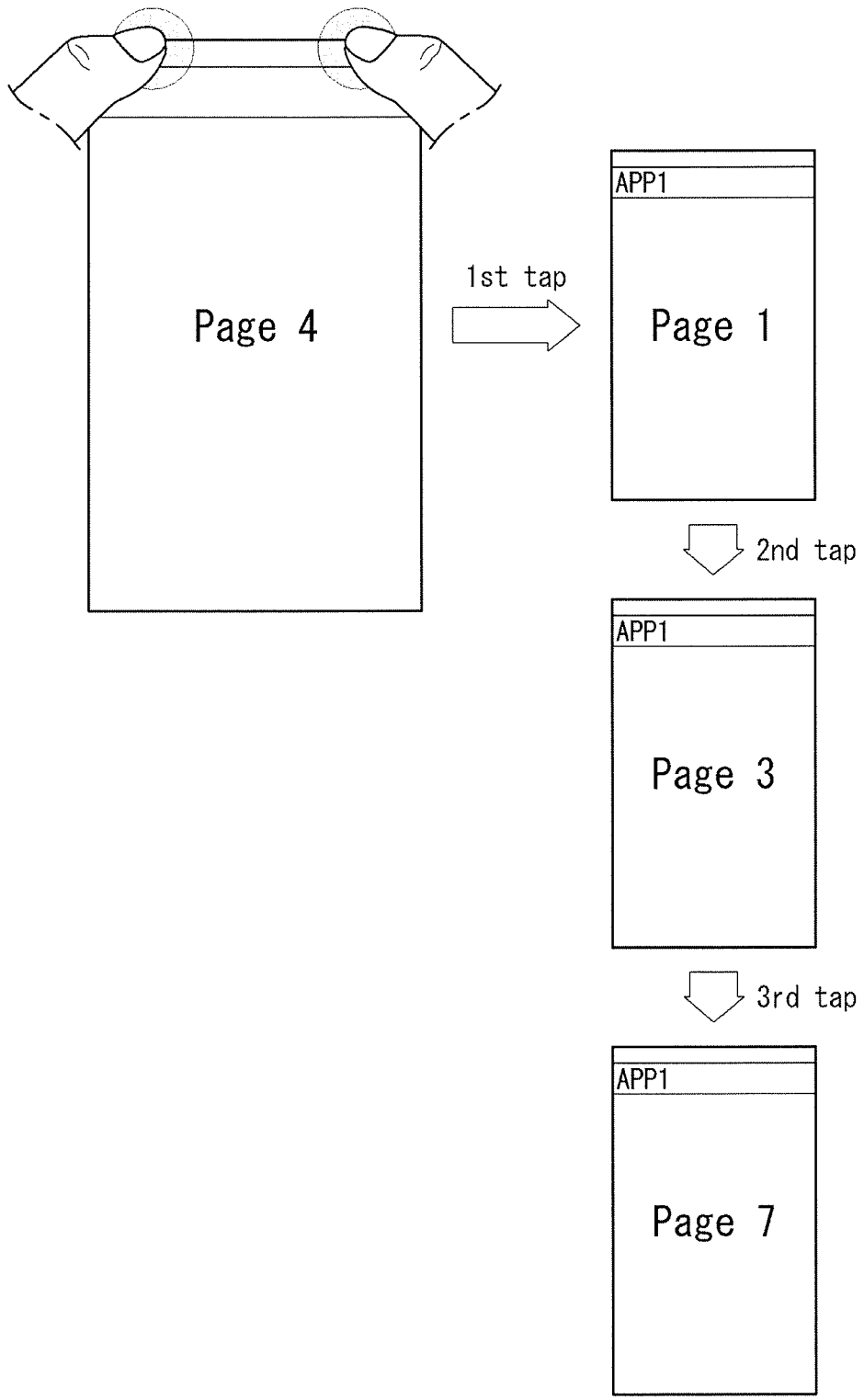

Next, FIGS. 15A and 15B are diagrams illustrating another example in which an initial screen according to the re-execution of an application is set in accordance with the second embodiment of the present invention. In the second embodiment of the present invention, a plurality of initial screens according to the re-execution of an application can be set through a predetermined input.

Referring to FIG. 15A, when a first force touch on a first page Page 1 displayed on the touch screen 151 is sensed after a first application APP1 is executed, the controller 180 can set the first page Page 1 as an initial screen according to the re-execution of the first application. Thereafter, when a second force touch is sensed when a third page Page 3 has been displayed on the touch screen 151, the controller 180 can add the third page Page 3 to the set initial screen. Furthermore, when a third force touch on a seventh page Page 7 is sensed, the controller 180 can add the seventh page to the set initial screen in addition to the first and the third pages.

In this instance, although the initial screen is set through the second and the third force touch after the first force touch, the setting of the initial screen for the first page set through the first force touch may not be removed. That is, the number of initial screens according to the re-execution of the first application may be plural.

If the first application is executed again when the plurality of initial screens has been set, the controller 180 can provide only the initial screen that has been first set, may provide any one of the set initial screens, or may provide all of the initial screens in a thumbnail image form. When an application is executed again when a plurality of initial screens has been set, the controller 180 can provide set initial screens in a pop-up form so that a user can select the set initial screens.

Referring to FIG. 15B, if a plurality of initial screens has been set, the plurality of set initial screens may be considered to be screens in which a user is interested. Accordingly, in accordance with one embodiment of the present invention, a screen set as an initial screen through a force touch may be used as a bookmark.

The controller 180 can fetch the plurality of initial screens set in FIG. 15A on a screen through a predetermined input. For example, when predetermined touch inputs for the indicator area of the touch screen 151 are sequentially sensed, the controller 180 can sequentially provide a plurality of predetermined initial screens to the touch screen 151. The predetermined touch input may include a multi-touch input for the indicator area.

Figure 16:
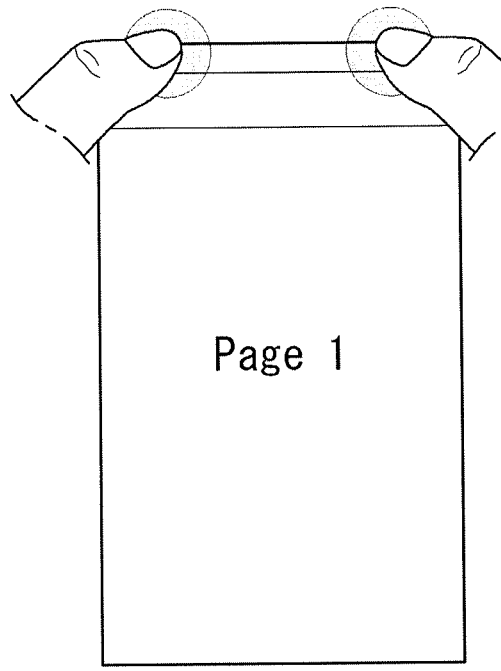
FIG. 16 is a diagram illustrating an example in which a screen to be displayed an initial screen in accordance with the re-execution of an application is edited in accordance with the second embodiment of the present invention.
Figure 16:
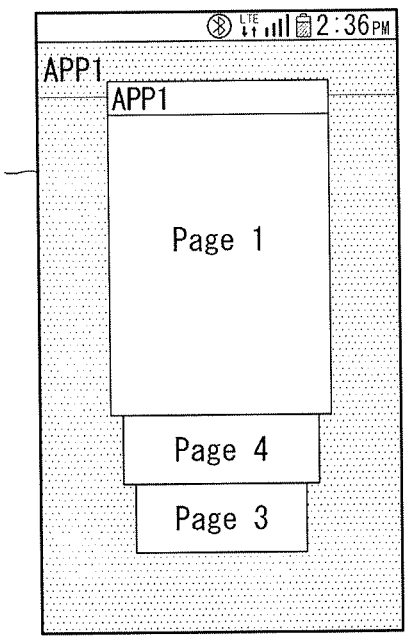
Figure 16:
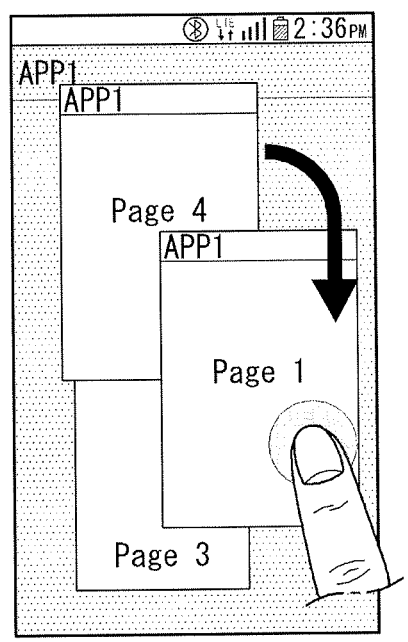
Figure 16:
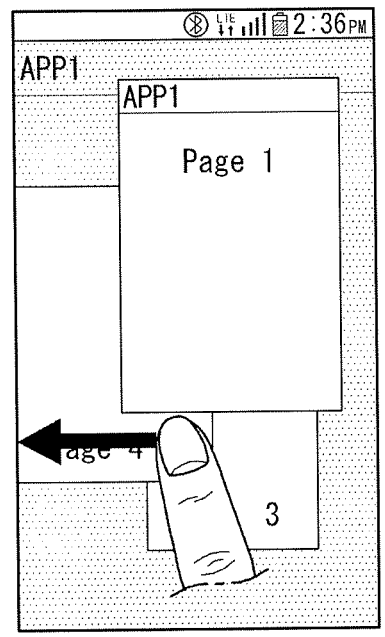

Referring to FIG. 16, if a plurality of initial screens has been set in relation to a first application APP1, the controller 180 can perform an edit function, such as deletion, in the sequence of initial screens provided in response to the re-execution of the first application or a designated initial screen. For example, when a predetermined input for the indicator area of the touch screen 151 is received when a plurality of initial screens has been set and the first application has been executed, the controller 180 can enter edit mode for editing a predetermined initial screen.

The controller 180 can display the plurality of predetermined initial screens in the edit mode. In the edit mode, at least some of the plurality of initial screens Page 1, Page 4, and Page 3 may be overlapped and displayed. The plurality of initial screens may be displayed in a layer form having a stack structure in a set sequence. That is, it may be seen that the first page Page 1 provided in a first layer has been first set as an initial screen, the fourth page Page 4 provided in a second layer has been set as a second initial screen, and the third page Page 3 provided in a third layer has been set as a third initial screen.

When an input for moving the location of the first initial screen Page 1 that belongs to the plurality of initial screens and that is displayed in the first layer to the location of the second layer is received, the controller 180 changes the locations of the first layer and the second layer. Accordingly, the controller 180 can set an initial screen that is first provided in response to the re-execution of the first application as the fourth page Page 4 displayed in the second layer (refer to FIG. 16(c)).

Furthermore, when an input for moving the second initial screen Page 4, displayed in the second layer, to the left through a drag input is received, the controller 180 can remove the fourth page Page 4 from a predetermined initial screen.

Figure 17:
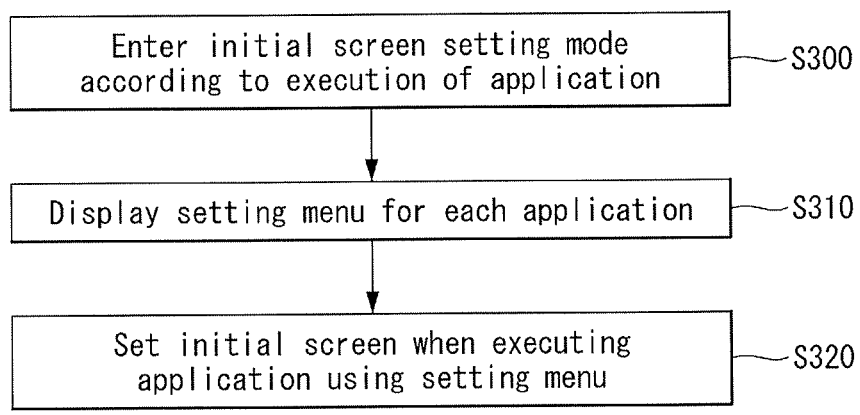
FIGS. 17 and 18 are diagrams illustrating a third embodiment of the present invention.
Figure 18:
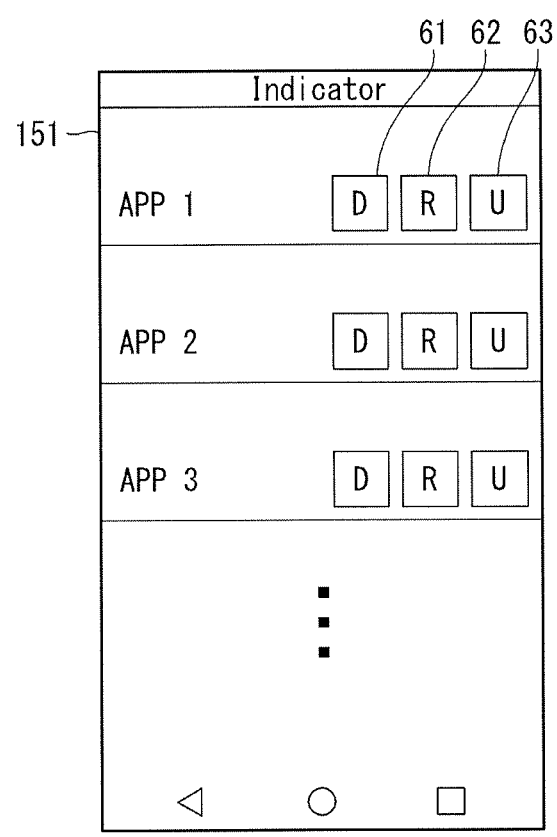
Figure 19A:
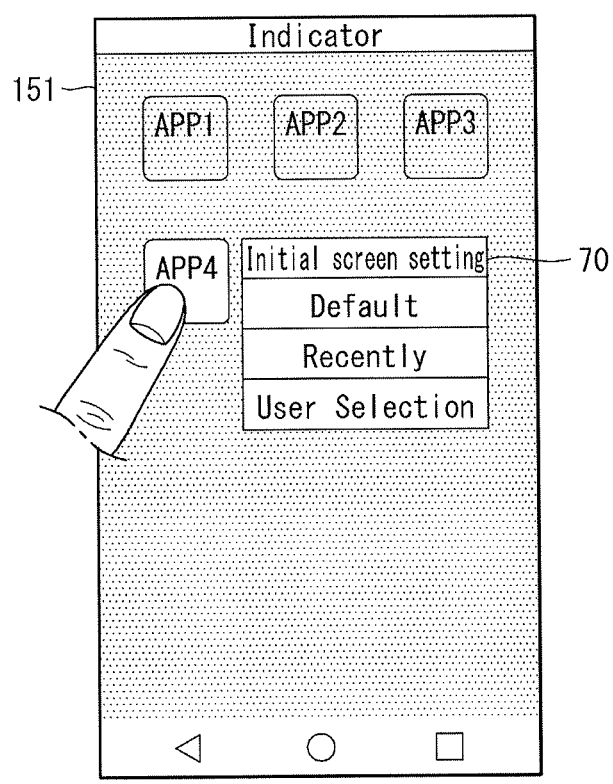
FIGS. 19A to 23B are diagrams illustrating examples in which the display of an initial screen according to the execution of an application is controlled in accordance with other embodiments of the present invention.
Figure 19B:
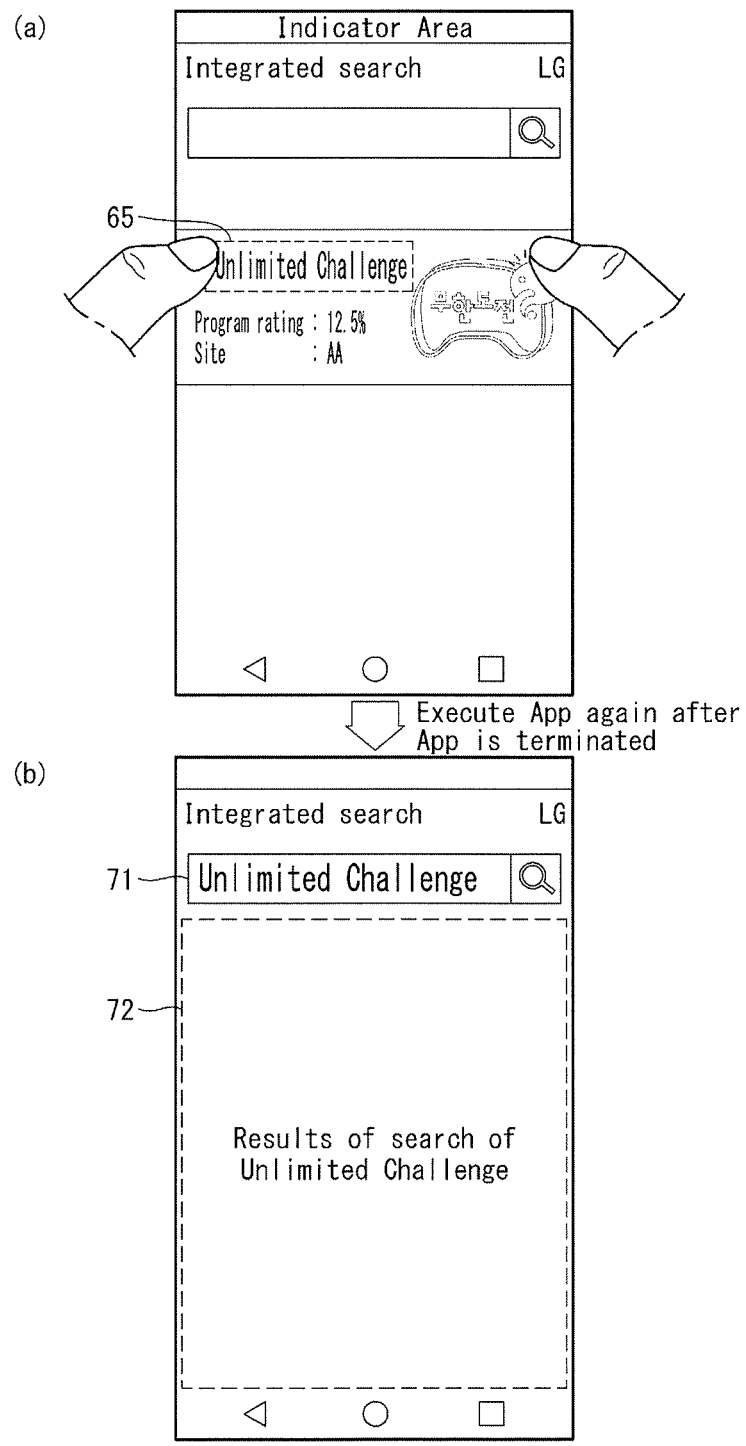

Next, FIG. 17 is a flowchart illustrating a method for controlling a mobile terminal according to a third embodiment of the present invention, and FIGS. 18 to 19B are diagrams illustrating the third embodiment of the present invention. The method for controlling a mobile terminal according to the third embodiment of the present invention may be implemented in the mobile terminal described with reference to FIGS. 1A to 2. The third embodiment of the present invention may be implemented in combination with at least part of the first embodiment and/or the second embodiment. The third embodiment of the present invention is related to a method for setting an initial screen according to the re-execution of an application after the application is terminated in the state in which the application has not been executed.

Referring to FIG. 17, the controller 180 can enter an initial screen setting mode for setting an initial screen provided when an application is executed at step S300. The controller 180 can display at least one application capable of setting an initial screen in the initial screen setting mode on the touch screen 151. The at least one application may be provided in a list form. Alternatively, an input for the at least one application provided in the initial screen setting mode is not recognized as an input for executing an application, but may be recognized as an input for setting an initial screen.

The controller 180 can provide a setting menu for each application to the touch screen 151 in the initial screen setting mode. The setting menu may be provided for each application in an application list. Furthermore, the setting menu may be provided when an application whose initial screen is to be set is selected.

The controller 180 can set an initial screen when an application is executed even without executing the application using a corresponding setting menu at step S320. That is, in accordance with the third embodiment of the present invention, the initial screen according to the execution of applications can be set at once with respect to a plurality of applications even without executing a specific application.

Referring to FIG. 18, when the controller 180 enters the initial screen setting mode, the controller 180 can display an application list on the touch screen 151. The application list may include a plurality of applications APP1, APP2, APP3, . . . , and setting mode 61, 62, and 63 in each of which an initial screen to be designated for each application may be set.

In more detail, the first setting mode 61 is a menu for setting a first screen set as an initial screen at the initial development stage of an application, as described above in connection with the first embodiment of the present invention. The second setting mode 62 is a menu displayed on a screen of the touch screen 151 right before an application that is being executed is terminated. If a screen has been set as an initial screen through the second setting mode, when a screen displayed on the touch screen 151 is changed whenever an application is terminated, an initial screen according to the re-execution of the application may be changed each time.

Furthermore, the third setting mode 63 is a menu activated if a predetermined touch input (e.g., a first force touch and a second force touch) for a specific one of pages provided in a process of executing an application is received and an initial screen is set, as described above in connection with the second embodiment of the present invention. If a specific screen has not been designated, the third setting mode can be provided in a deactivated state or a pop-up window that provides notification that a designated initial screen is not present although the third setting mode is selected may be provided.

Referring to FIG. 19A, the controller 180 can enter the initial screen setting mode on a home screen including one or more applications APP1, APP2, APP3, and APP4. For example, if a force touch exceeding specific threshold strength has been applied to an icon for the fourth application, the controller 180 can display a pop-up window 70 for providing an initial screen setting menu around an icon for the second application. The pop-up window may include a first setting menu "Default, a second setting menu "Recently", and a third setting menu "User selection."

Referring to FIG. 19B, as described above in connection with the second embodiment of the present invention, when the third setting menu is selected and when a specific screen has not been set as an initial screen according to the re-execution of an application in response to a user selection, the controller 180 can provide a notification window 71 that provides notification that an initial screen designated by a user is not present. Furthermore, the controller 180 can perform an operation for separately setting an initial screen by executing the fourth application.

Figure 20:
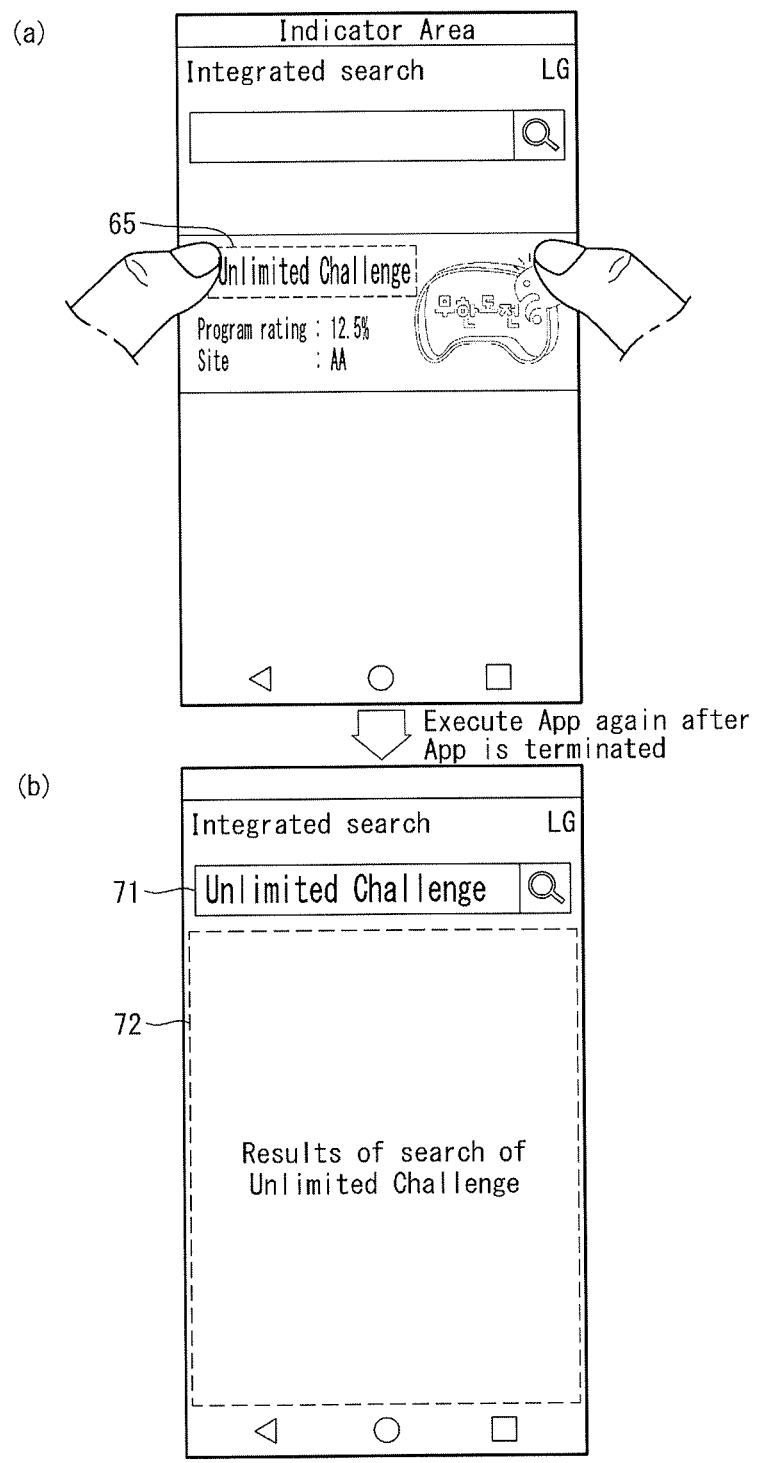

Next, FIGS. 20 to 23B are diagrams illustrating examples in which the display of an initial screen according to the execution of an application is controlled in accordance with other embodiments of the present invention. Referring to FIG. 20, in one embodiment of the present invention, an initial screen according to the re-execution of an application can be set based on content displayed on a specific screen. For example, the content may include text or an image.

Referring to FIG. 20, when a first force touch on text 65 displayed on a webpage and a second force touch on another space other than the text 65 are received, the controller 180 can set the text 65 as an entry keyword for the webpage. When the webpage is provided in response to the re-execution of an application, the predetermined entry keyword can be automatically attached to the search word input box of the webpage. The controller 180 can provide search results 72 based on the entry keyword to the webpage.

Figure 21:
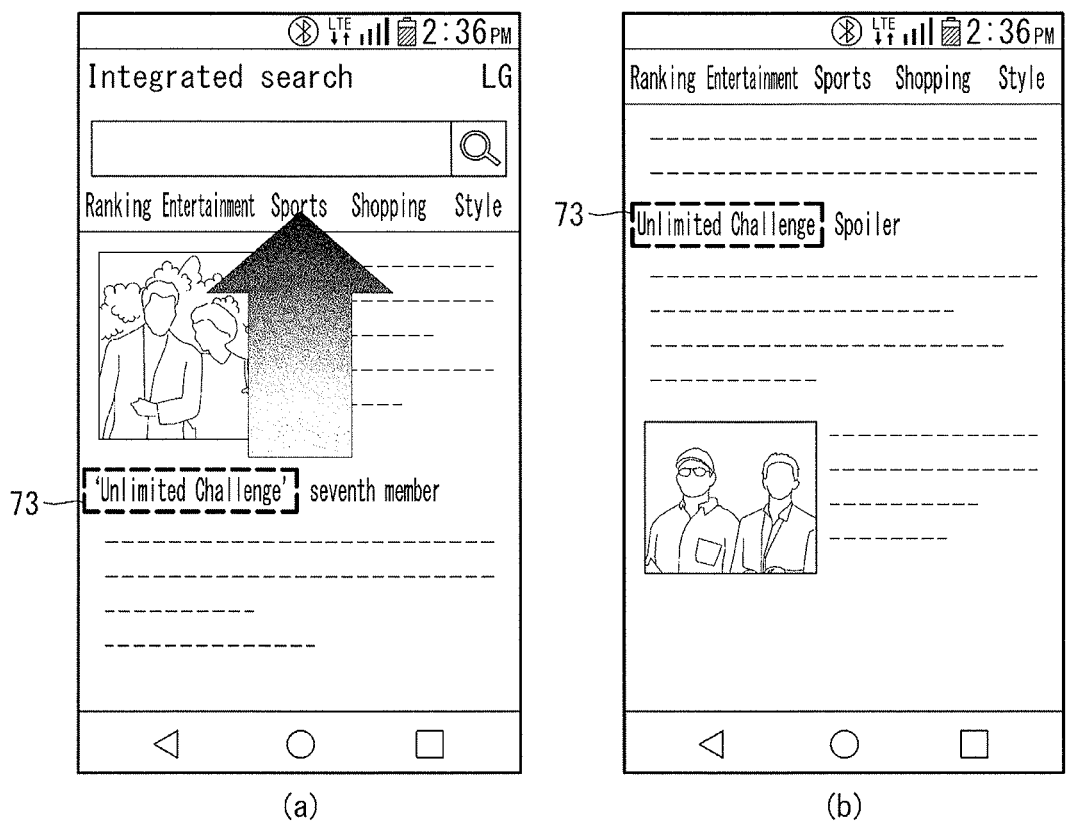

Furthermore, referring to FIG. 21, if the application is executed again when the specific text 65 has been designated as shown in FIG. 20, and when the designated text is displayed at a specific location 73 of the execution screen of the application, the controller 180 can control the execution screen so that it is displayed in one region of the touch screen 151 by upward scrolling the execution screen.

Figure 22:
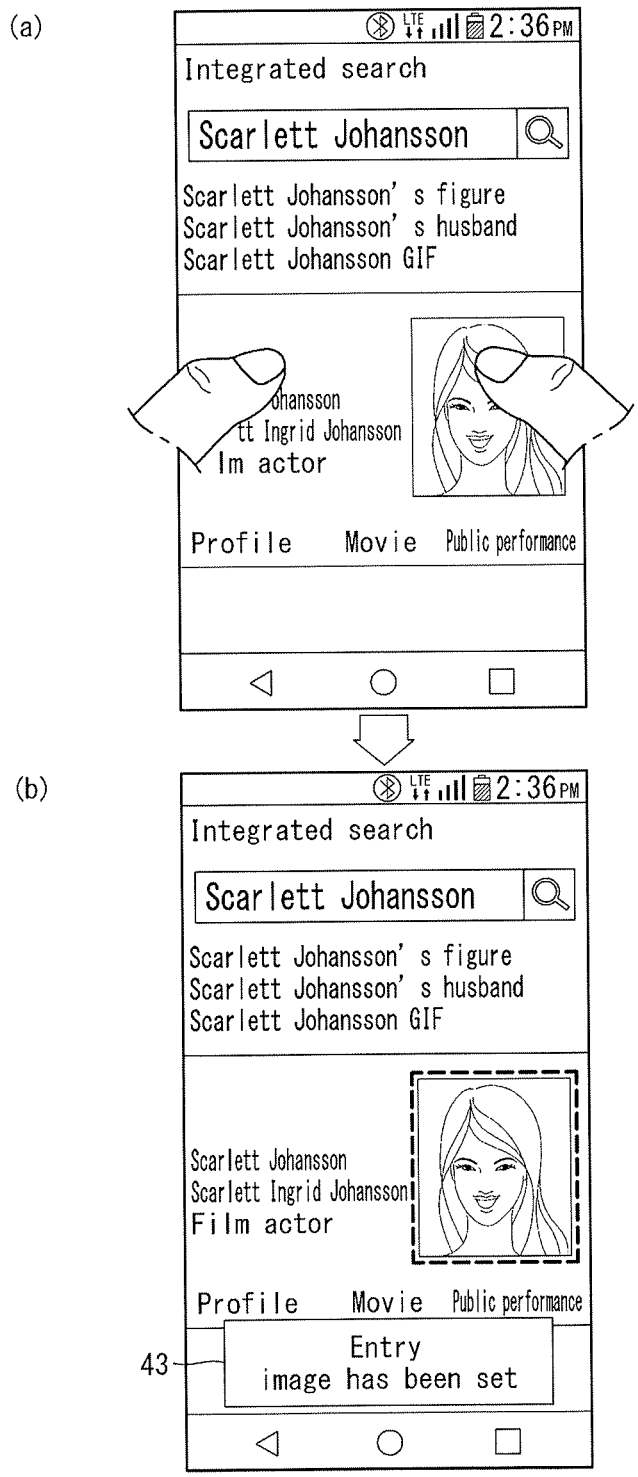

Referring to FIG. 22, the controller 180 can set a specific image provided to an application execution screen so that the specific image is displayed on an initial screen. For example, the controller 180 can designate an image by receiving a first force touch input for the image displayed on the application execution screen and receiving a second force touch input for the remaining region. When an application is executed again, the controller 180 can automatically attach text, corresponding to the image, to a search word input box, and may display the results of the search on an initial screen.

Figure 23A:
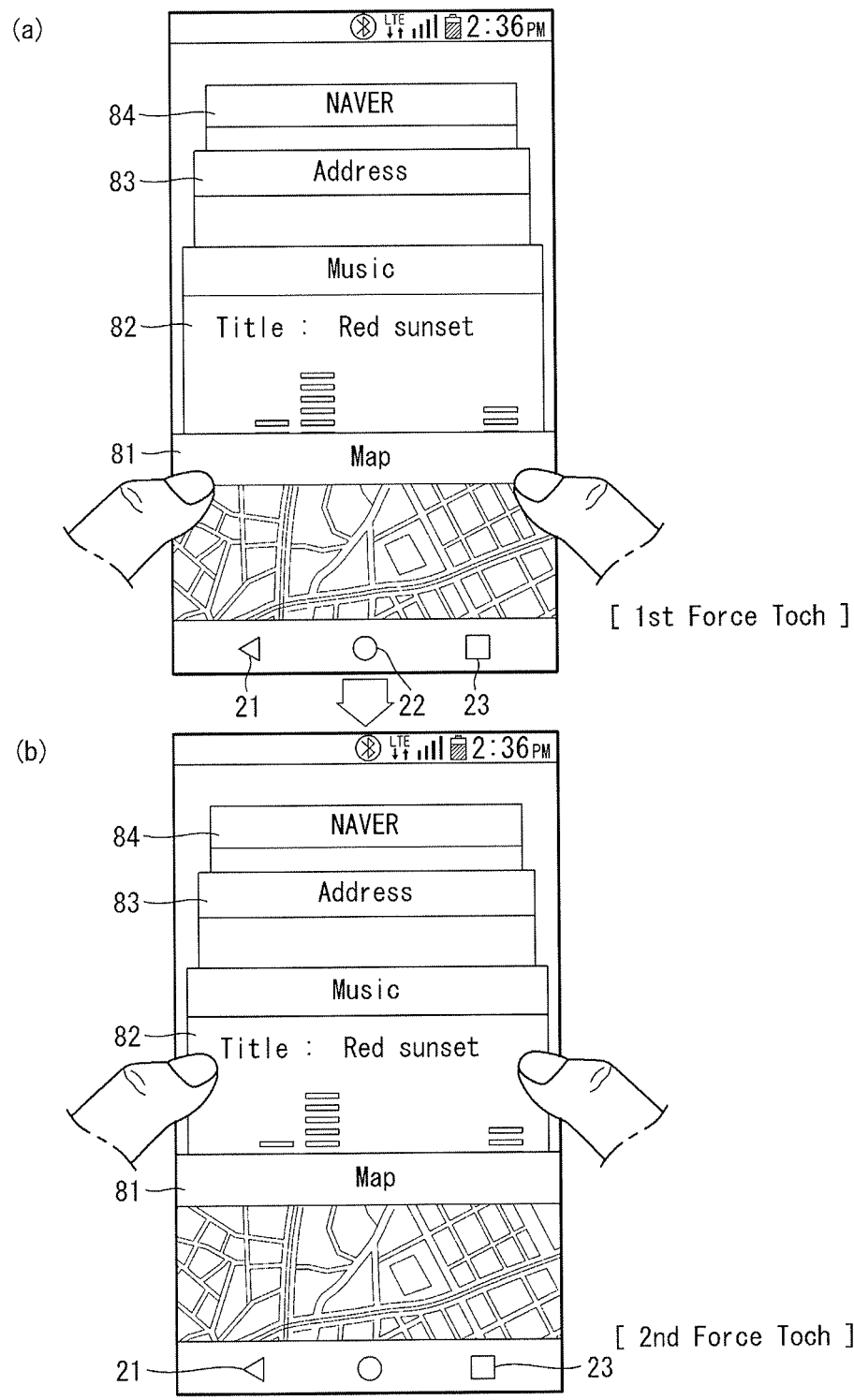

Referring to FIG. 23A, the controller 180 can provide one or more applications 81, 82, 83, and 84 that are being executed in the background and that have been recently executed to the touch screen 151. The controller 180 can receive a first force touch input for the first application 81 of the one or more applications 81, 82, 83, and 84, and may receive a second force touch input for the second application 82. That is, the controller 180 can set the sequence in which an application that is being executed in the background switches to a foreground state through a force touch input.

Figure 23B:
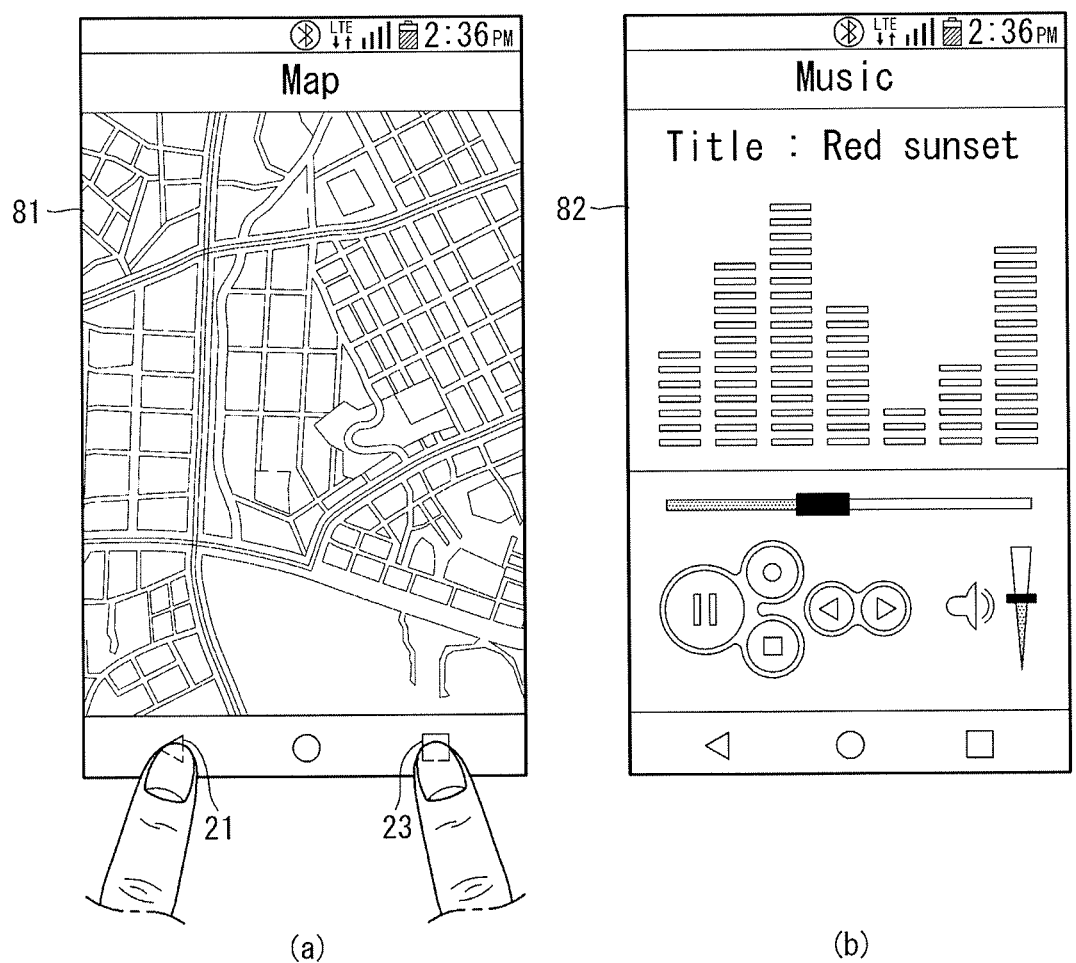

Referring to FIG. 23B, when a predetermined input is received when the first application 81 is being executed in foreground, the controller 180 can change the execution state of the second application 82 that is being executed in the background into a foreground state. The predetermined input may include an input for selecting a first key 21 and a third key 23 substantially at the same time. As described above, the first key 21 is a key for returning to a previous step, and the third key 23 is a key for displaying at least one application that is being executed in the background on the touch screen 151.

The mobile terminal and the method for controlling the mobile terminal according to the embodiments of the present invention have the following advantages. In accordance with an embodiment of the present invention, a user interface can be provided which enables a user to control a mobile terminal easily and efficiently.

Furthermore, in accordance with an embodiment of the present invention, a user can enter a required screen using a more efficient and simpler method in an application for executing a plurality of functions through stepwise entry. In addition, in accordance with an embodiment of the present invention, an unnecessary manipulation for entering a required screen can be minimized by setting the required screen as an initial screen when an application is executed again after the application is terminated. In accordance with an embodiment of the present invention, an initial screen according to the execution of each application can be set using a simpler method even without executing each of a plurality of applications.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (e.g., a transmission over the Internet). The processor may include the controller 180 of the mobile terminal.

The foregoing embodiments are merely exemplary and are not to be considered as limiting the present disclosure. The present teachings may be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a wireless communication processor configured to provide wireless communication;
a touch screen;
a force sensor separated from or integrated with the touch screen and configured to generate a force signal indicative of a strength of a touch input on the touch screen; and
a controller configured to:
in response to a request to execute an application, execute the application and display an execution screen of the application on the touch screen,
terminate the application and stop displaying the execution screen on the touch screen, and
in response to a request to re-execute the terminated application, re-execute the application and display an initial screen on the touch screen, wherein the initial screen is a third screen designated through a first predetermined input for at least one page provided through the application,
wherein the first predetermined input comprises a touch input in which a strength of the touch input sensed for the third screen through the force sensor exceeds a threshold strength,
wherein the touch input comprises a multi-touch input comprising a second touch input received substantially simultaneously with a first touch input or received while the first touch input is maintained, the first touch input and the second touch input being touched on an indicator area on the touch screen, wherein the indicator area is positioned at an upper edge of the touch screen,
wherein the controller is configured to set the third screen as the initial screen when both the first touch input and the second touch input exceed the threshold strength, and
wherein the controller is further configured to set a first screen as the initial screen to be displayed on the touch screen based on the first predetermined input having a first force, set a second screen as the initial screen to be displayed on the touch screen based on the first predetermined input having a second force stronger than the first force, and set the third screen as the initial screen to be displayed on the touch screen based on the first predetermined input having a third force stronger than the second force.

2. The mobile terminal of claim 1, wherein the application being executed comprises the application being executed in the foreground or in the background.

3. The mobile terminal of claim 1, wherein the controller is configured to:
display a user interface for selecting any one of the first screen, the second screen, and the third screen on the touch screen, wherein the first screen is set in an initial stage of the application being executed, and the second screen is displayed on the touch screen before the application is terminated, and
set the selected screen to be the initial screen.

4. The mobile terminal of claim 3, wherein the controller is configured to:
successively display at least first, second and third execution screens of the executing application, and
in response to the re-execution of the application, display the first execution screen as the initial screen.

5. The mobile terminal of claim 4, wherein the controller is further configured to:
terminate the application while the second execution screen is being displayed,
in response to the re-execution of the application, display the second execution screen as the initial screen.

6. The mobile terminal of claim 5, wherein the controller is further configured to:
in response to the first predetermined input being on the third execution screen, and in response to the re-execution of the application, display the third execution screen as the initial screen.

7. The mobile terminal of claim 1, wherein the first predetermined input includes inputs sequentially performed on at least two of a plurality of screens provided through the application, and
wherein the controller is configured to set a sequence of corresponding initial screens to be displayed on the touch screen in an order of the inputs sequentially performed.

8. The mobile terminal of claim 7, wherein when second predetermined inputs for fetching the plurality of set initial screens are sequentially received while the application displays a specific screen on the touch screen, the controller is configured to sequentially display the initial screens set in response to the first predetermined inputs on the touch screen.

9. The mobile terminal of claim 1, wherein when the third screen is set through a predetermined input, the controller is configured to output an alarm providing notification that the initial screen according to the re-execution of the application has been set.

10. The mobile terminal of claim 1, wherein the at least one page provided through the application provides a scrollable page, and
when the first predetermined input is received while at least part of the scrollable page has been displayed on the touch screen, the controller is configured to set a page of the at least part as the third screen.

11. The mobile terminal of claim 1, wherein the at least one page provided through the application comprises at least one item corresponding to at least one function provided by the application, and
when the first predetermined input for a specific item of the at least one item is received, the controller is configured to set a screen according to an execution of the specific item as the third screen.

12. The mobile terminal of claim 1, wherein the controller is further configured to:
successively display a first home screen, a second home screen and a third home screen on the touch screen,
receive the first predetermined input when the second home screen is being displayed, and
set the second home screen as the initial screen to be displayed on the touch screen when the mobile terminal is turned on.

13. The mobile terminal of claim 1, wherein the controller is further configured to:
display a plurality of set alarms as the execution screen,
receive the first predetermined input on a particular alarm among the plurality of set alarms, and
set the particular alarm as the initial screen to be displayed on the touch screen when the plurality of set alarms are re-displayed.

14. The mobile terminal of claim 1, further comprising:
a memory configured to store at least one application,
wherein the controller is further configured to:
display a setting mode screen on the touch screen including a plurality of setting modes to be set for each of the at least one application, and
wherein the plurality of setting modes set what initial screen will be displayed on the touch screen when the application is executed and include a default setting mode for displaying a default execution screen of the application when the application is executed, a recent setting mode for displaying a recently displayed execution screen of the application when the application is executed, and a user set execution screen for the application when the application is executed.

15. The mobile terminal of claim 14, wherein the at least one application includes a plurality of applications and the setting mode screen includes the plurality of applications in a list form with each application including the plurality of setting modes.

* * * * *